April 5, 1938.  W. G. BALDENHOFER  2,113,287
MACHINE FOR GRINDING AND SHARPENING BROACHES
Filed June 14, 1937  15 Sheets-Sheet 1
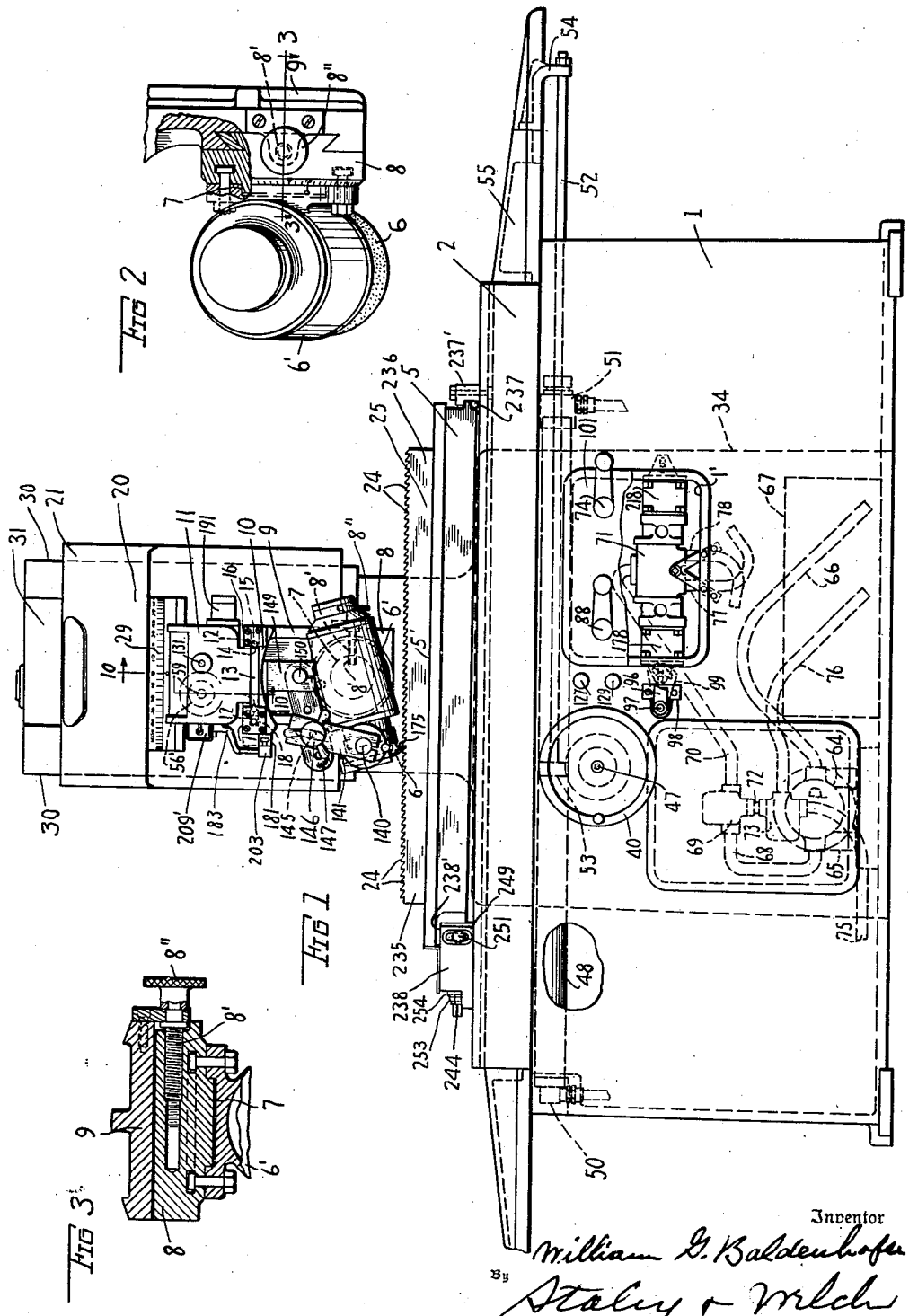
Inventor
William G. Baldenhofer
By Staley & Welch
Attorneys April 5, 1938. W. G. BALDENHOFER 2,113,287
MACHINE FOR GRINDING AND SHARPENING BROACHES
Filed June 14, 1937 15 Sheets-Sheet 2
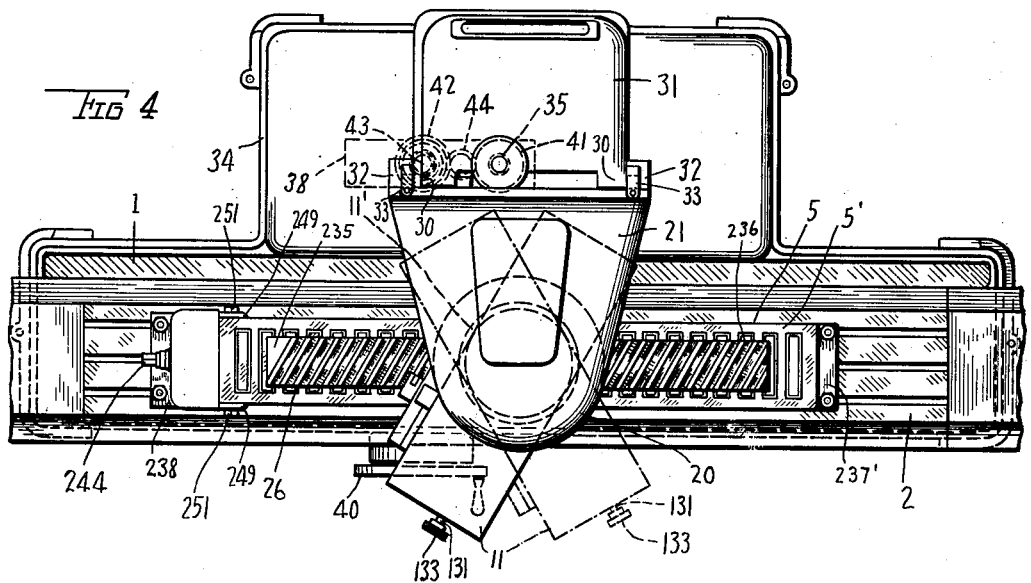
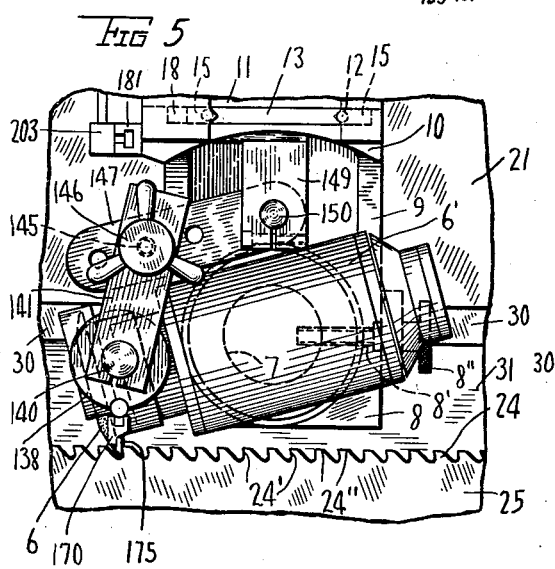
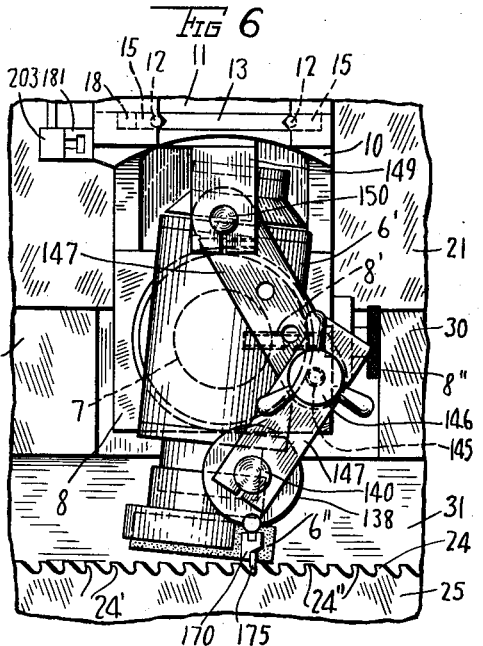

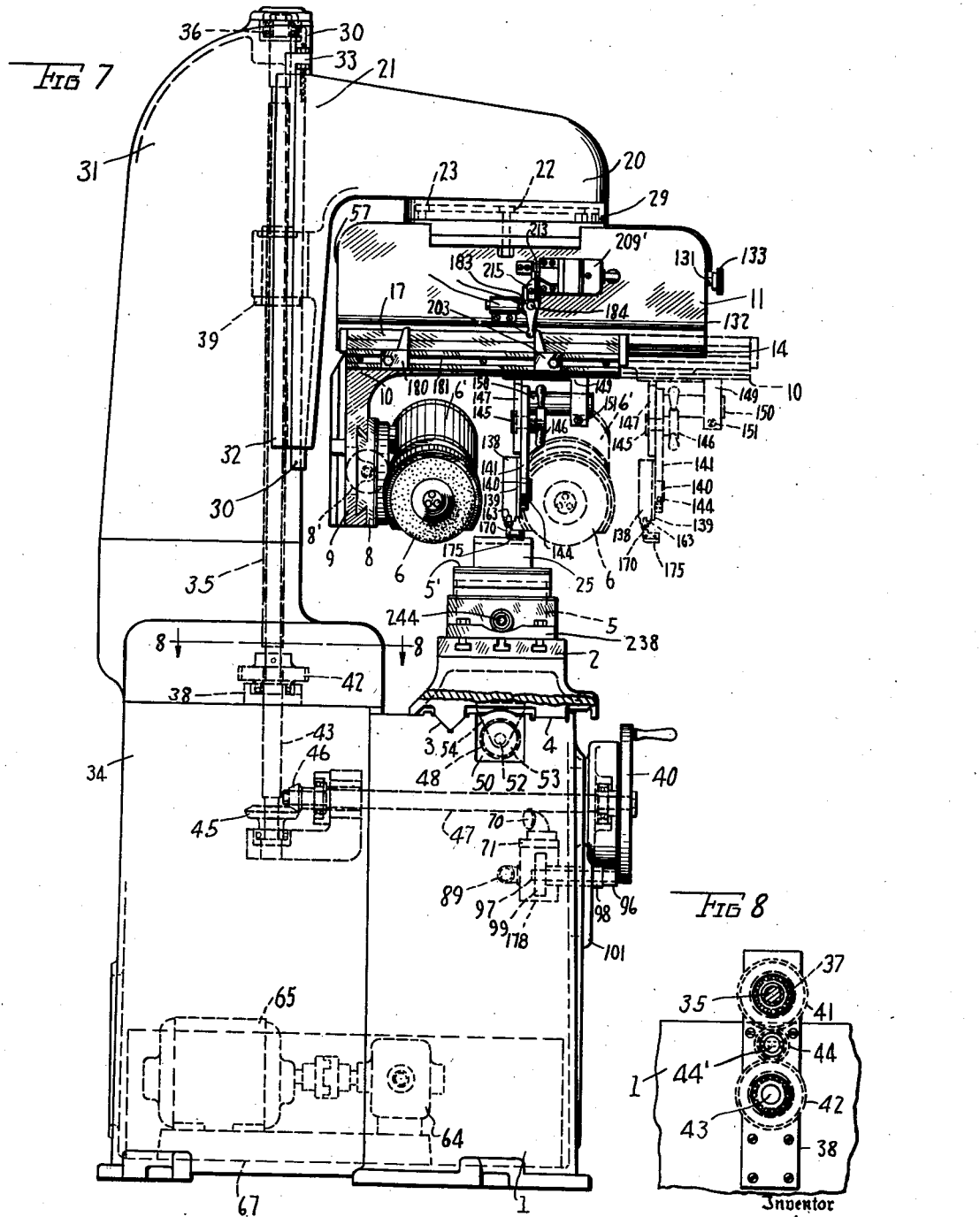

April 5, 1938.   W. G. BALDENHOFER   2,113,287
MACHINE FOR GRINDING AND SHARPENING BROACHES
Filed June 14, 1937   15 Sheets-Sheet 5
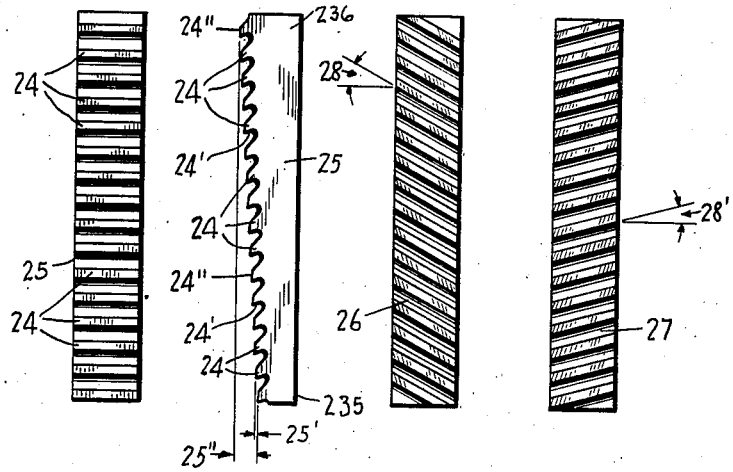
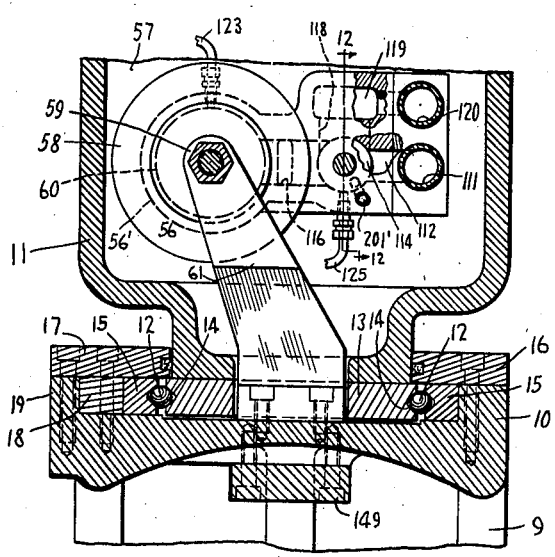
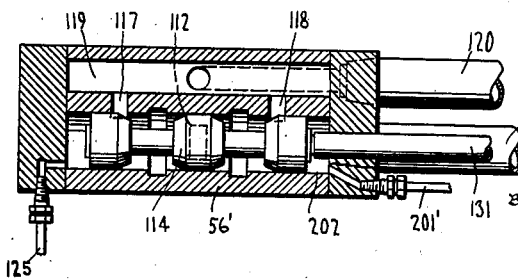

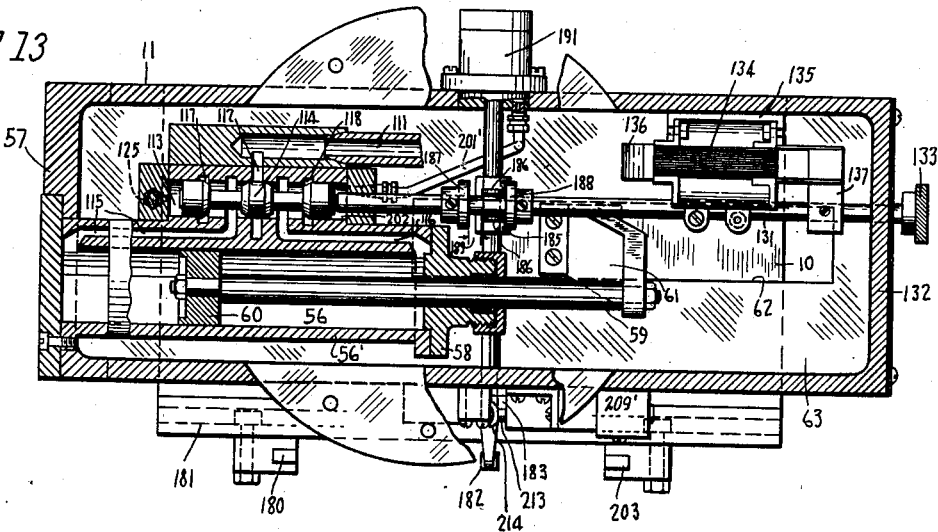

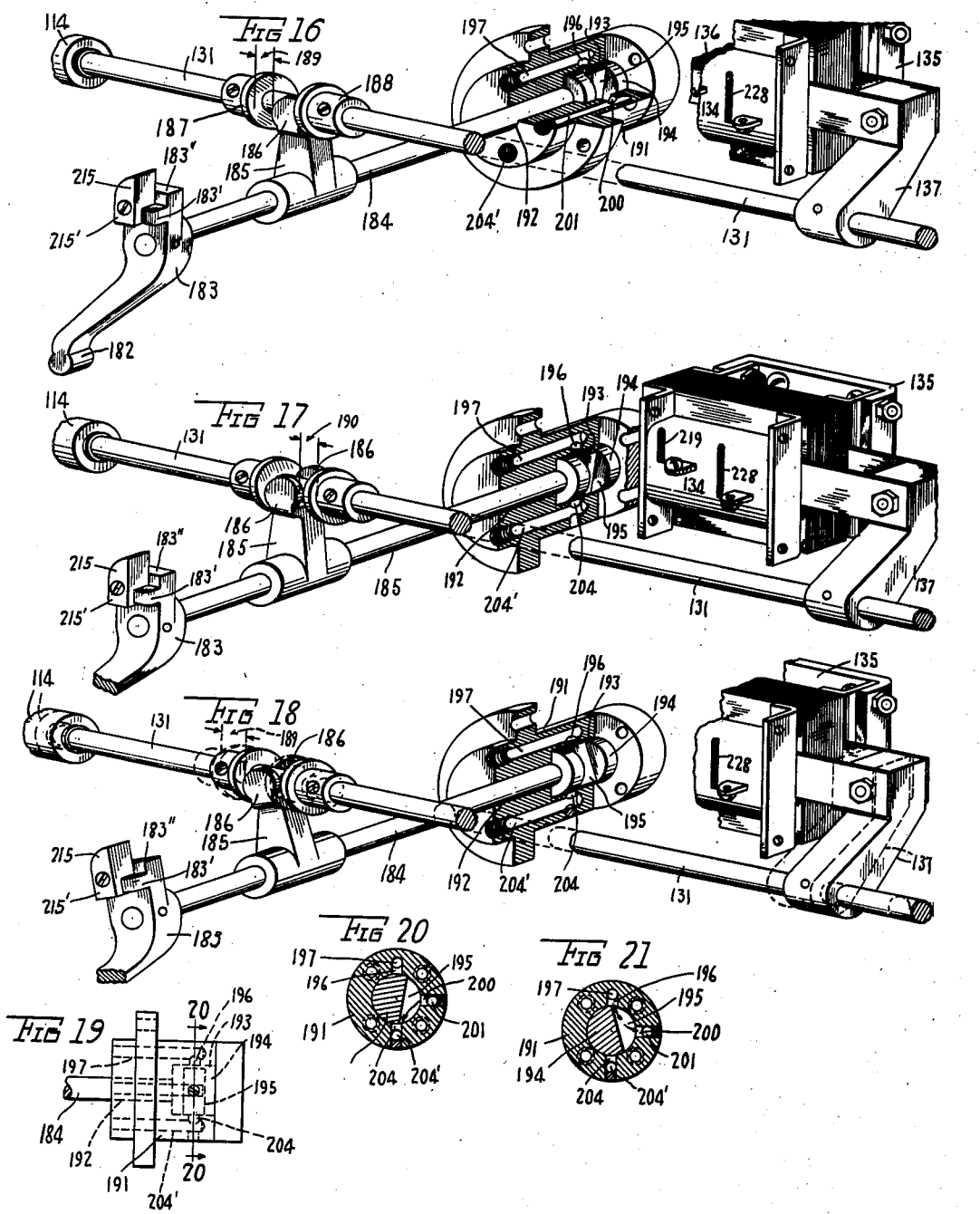

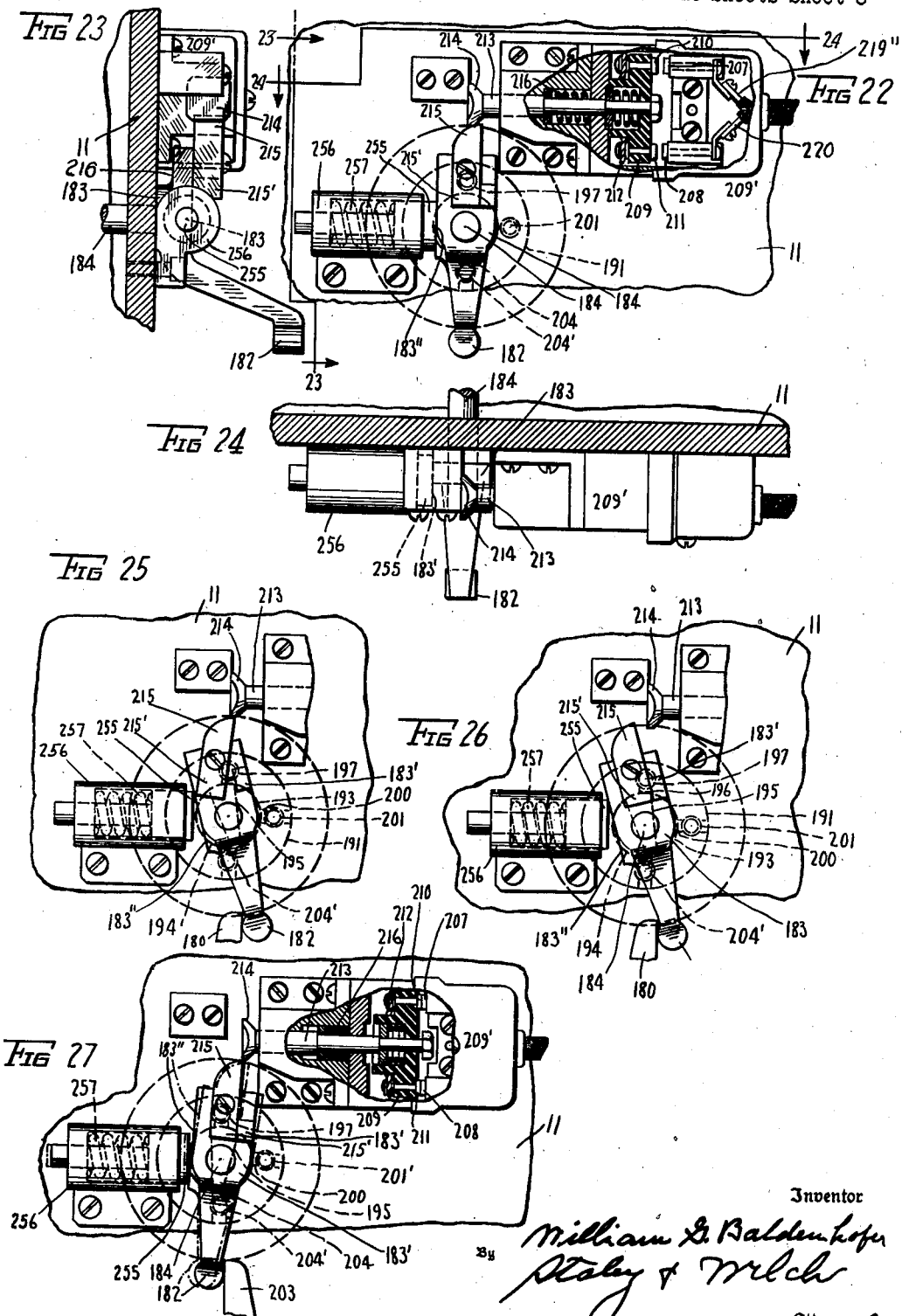

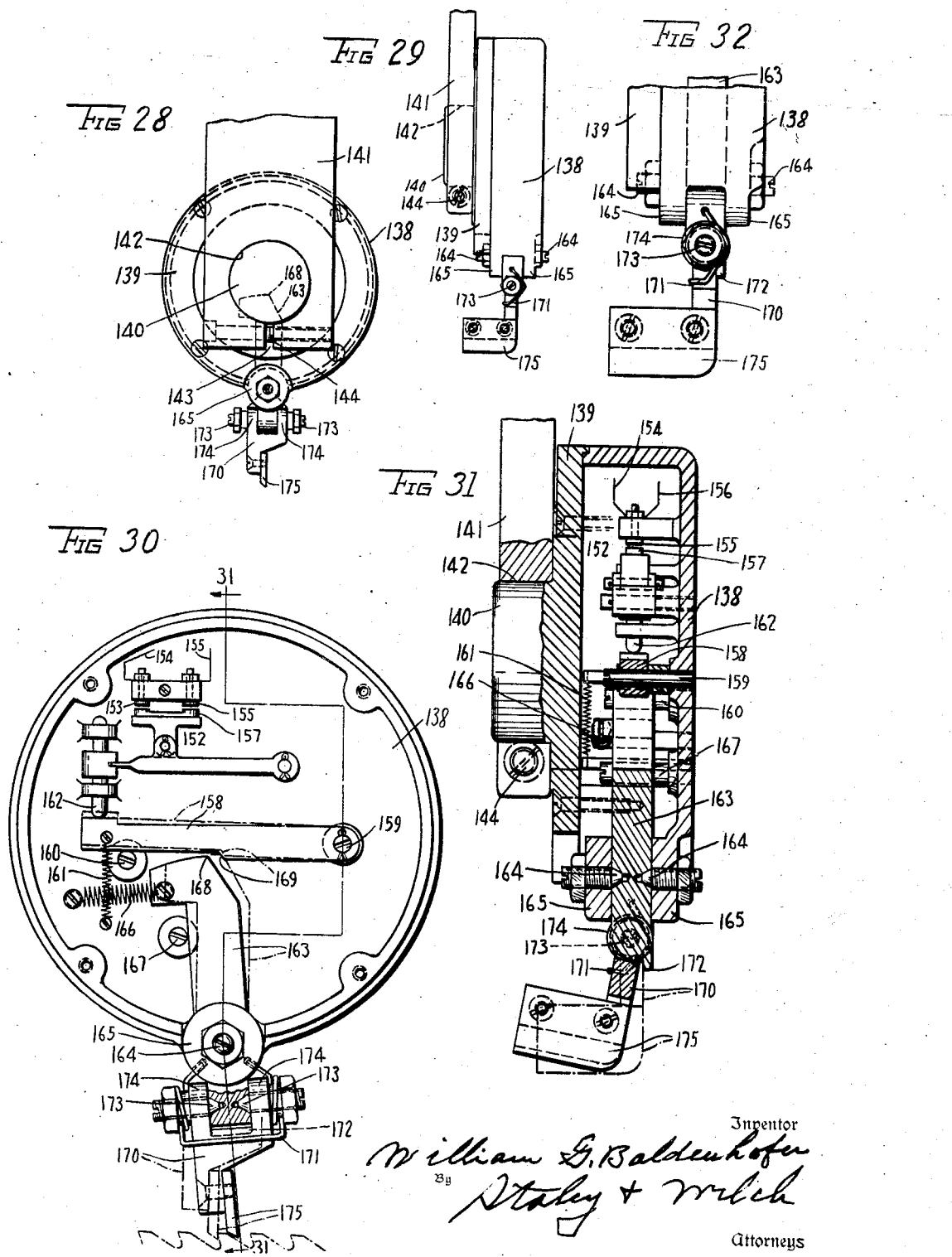

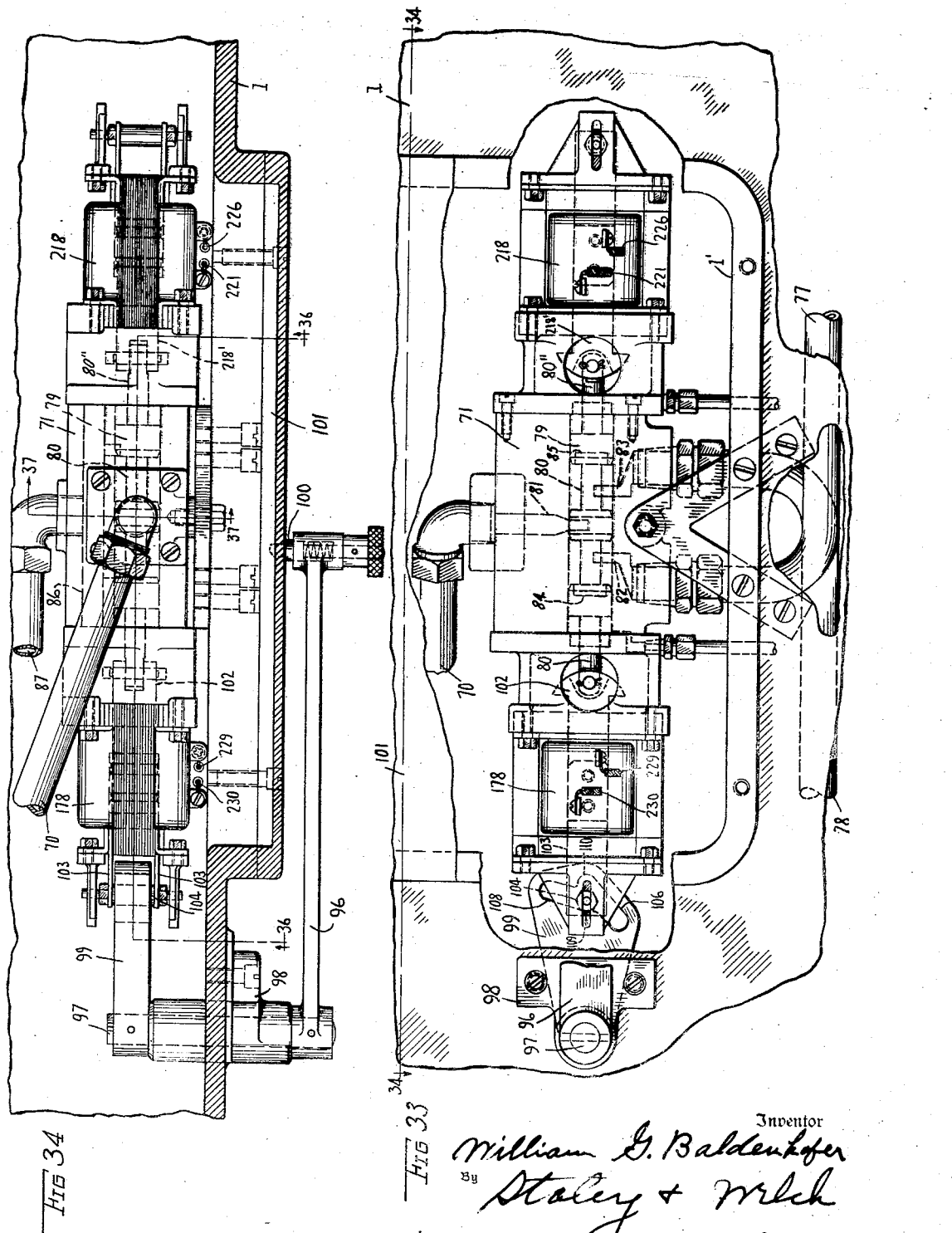

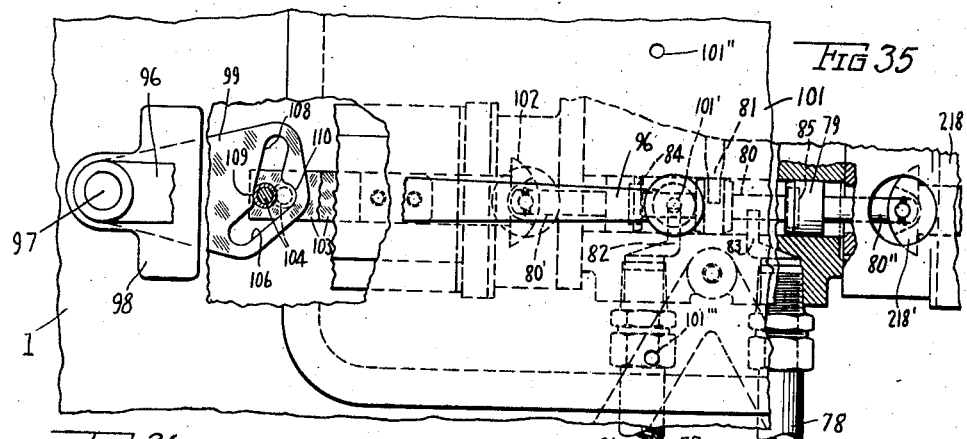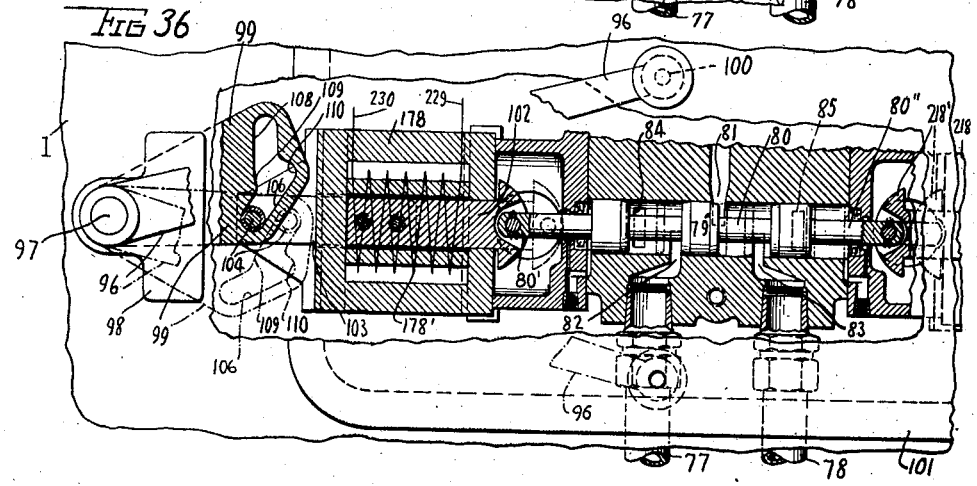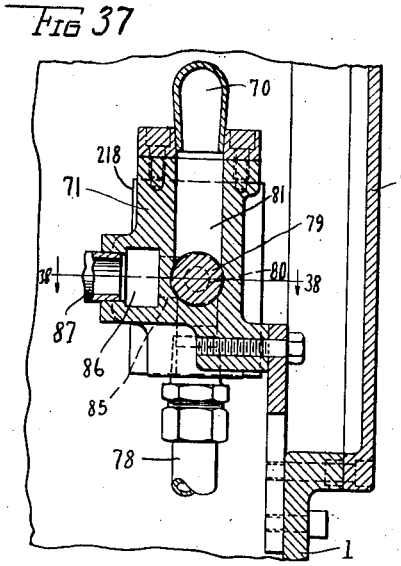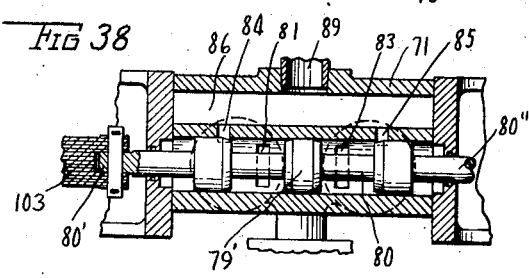

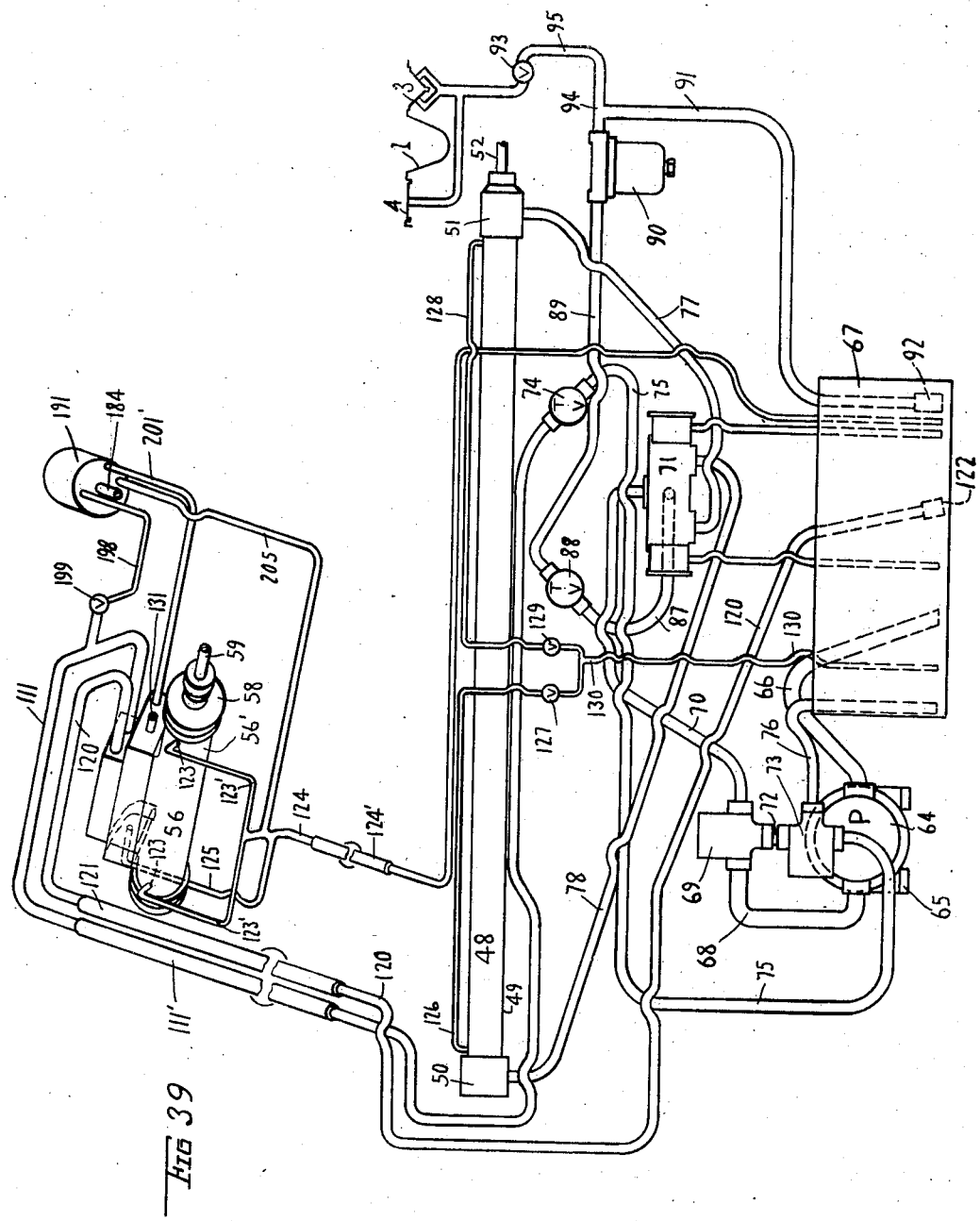

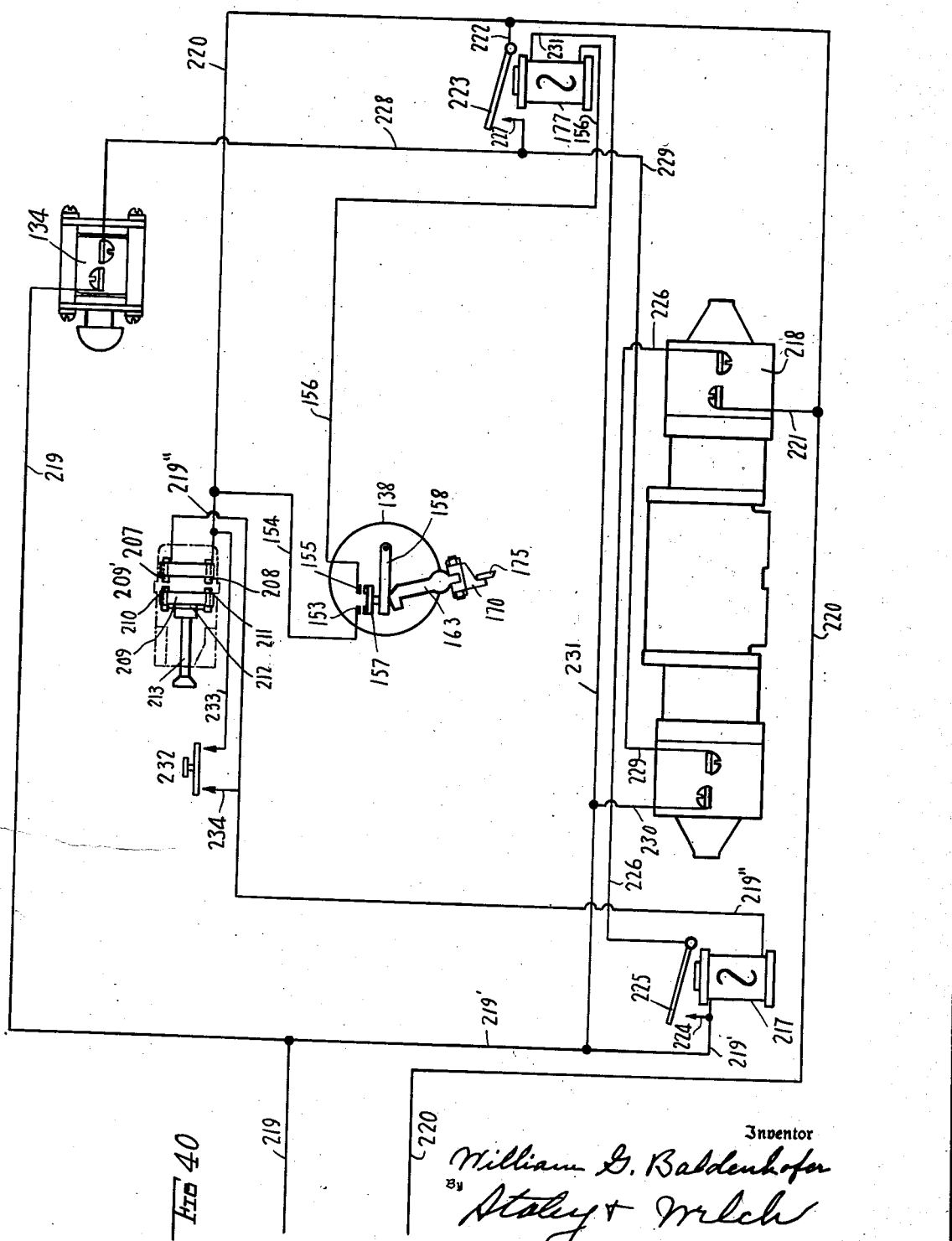

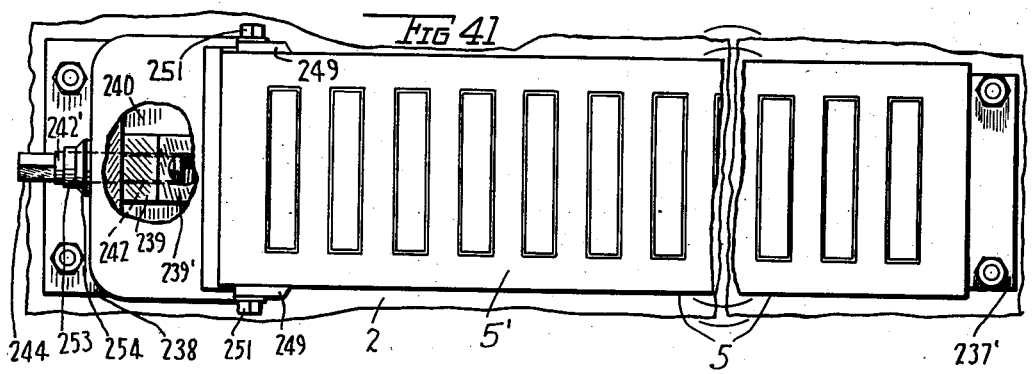
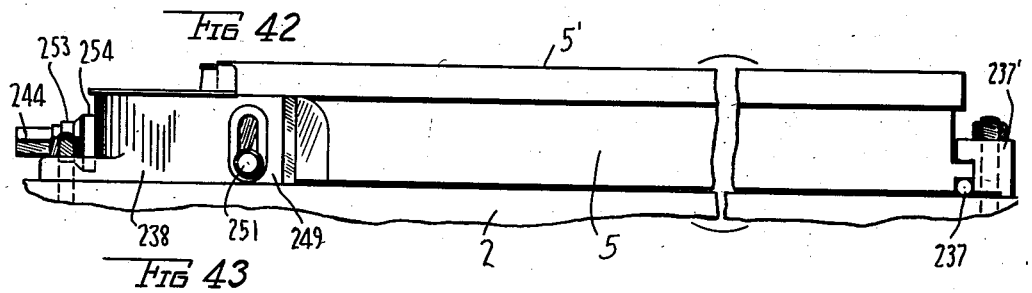
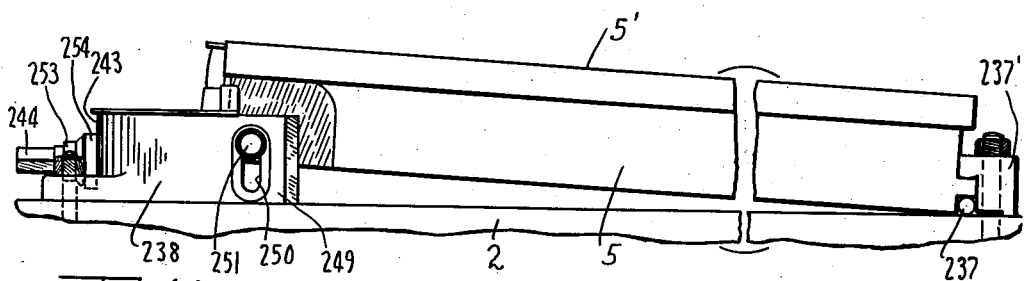
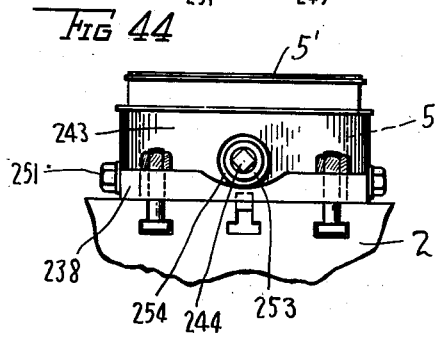
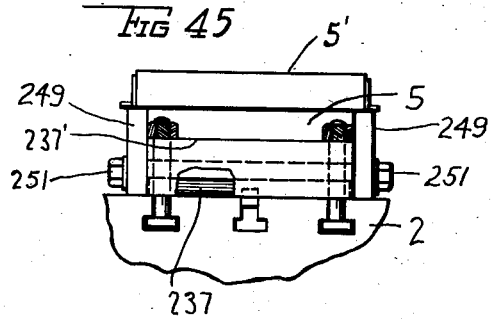

April 5, 1938.     W. G. BALDENHOFER     2,113,287
MACHINE FOR GRINDING AND SHARPENING BROACHES
Filed June 14, 1937     15 Sheets-Sheet 15
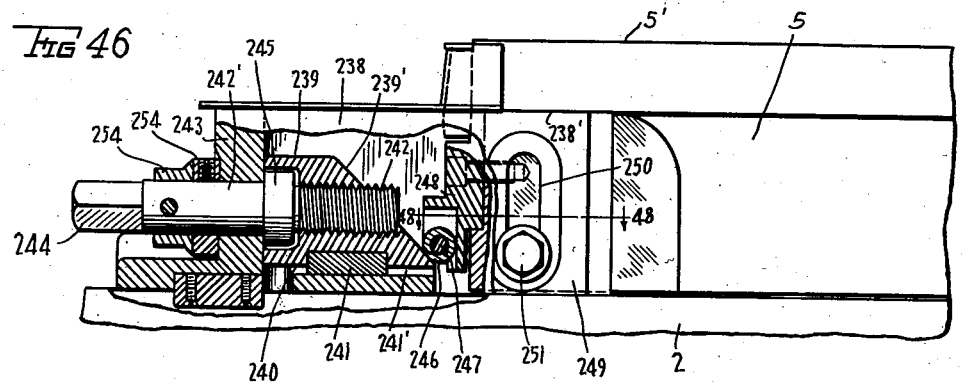
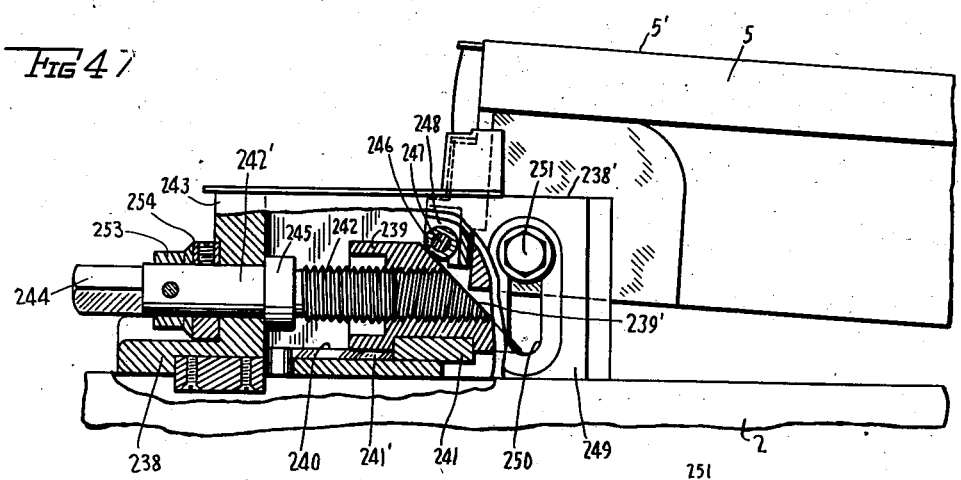
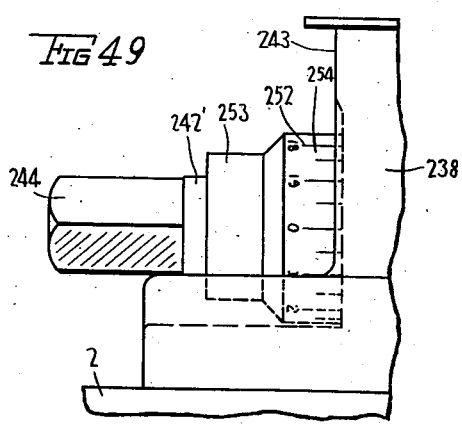
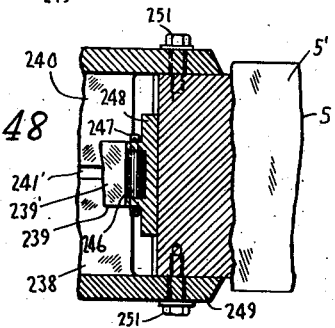
William G. Baldenhofer, Inventor
By Staley & Welch, Attorneys Patented Apr. 5, 1938

2,113,287

UNITED STATES PATENT OFFICE 2,113,287

MACHINE FOR GRINDING AND SHARPENING BROACHES

William G. Baldenhofer, Springfield, Ohio, assignor to The Thompson Grinder Company, Springfield, Ohio, a corporation of Ohio Application June 14, 1937, Serial No. 148,081

25 Claims. (Cl. 51—56)

This invention relates to improvements in machines for grinding and sharpening broaches, it more particularly relating to machines which are adapted to perform this work automatically.

While broaches have been in use for many years, it has only been recently that an extensive use has been made of them, more particularly in the automotive and refrigerator manufacturing fields, and broaching machines at times having several broaches are now employed in great numbers. Generally, there are more flat broaches than any other kind, such broaches being used to machine pads, bosses and the like on work pieces held in fixtures, and the machine here illustrated and described is more particularly adapted to the sharpening of flat broaches, although some of its principles are equally applicable to the sharpening of round broaches. The broaches are removably secured to the broaching machines so that they may be taken off and re-sharpened, which operation is necessary in some cases every two or three days.

The machine consists broadly of the following parts: A support is provided for the broach during the sharpening operation which in the present case is a magnetic chuck mounted on a table together with means for imparting a step-by-step feeding movement to the table, the chuck being mounted on the table at a predetermined angle depending upon the taper of the broach.

A grinding wheel of the disk type is mounted in a carriage which has means for reciprocating it with the grinding wheel parallel with the working faces of the teeth, provision being made in the present case for providing for one cycle of the grinding wheel for each tooth. The reciprocation of the grinding wheel is accurately timed with the step-by-step feeding movement of the table that supports the broach so that when the grinding wheel is withdrawn from its grinding position with relation to the broach the table will be fed to bring the next tooth in line with the grinding wheel which is then given another cycle of movement and so on until the forward working faces of the teeth of the broach have all been operated upon.

The table which supports the broach is restored to its initial starting position, another grinding wheel of a cup-type is substituted for the disk type grinding wheel and the operation repeated to grind the lands of the teeth of the broach.

The step-by-step movement of the table which supports the broach is accomplished by a hydraulic motor, the control valve of which is actuated by electrical means set in operation by an electrical switch whose actuating devices are located in the path of the broach teeth so that when any one of the teeth makes contact therewith it will stop the feeding movement of the table and set in operation another hydraulic motor by controlling its valve to impart reciprocation to the grinding wheel head, the grinding wheel head making one cycle of movement and stopping by a form of hydraulic and electrical control.

The control member which makes contact with the teeth of a broach is mounted upon the tool head and is brought out of engagement with the teeth as the tool head moves to bring the grinding wheel into operative position with the teeth. As the tool head completes its cycle of movement controlling devices connected therewith operate to stop the hydraulic motor which moves the tool head and start the hydraulic motor that moves the table. The tooth that is to be ground is the one that is contacted by the table stopping mechanism. Therefore, this machine is adapted for the grinding of broach teeth which are either regularly spaced or irregularly spaced which would relieve the manufacturer of making broaches with regularly spaced teeth for convenience in sharpening.

One of the objects of the invention is the provision of a grinding machine for sharpening broaches whereby the initial sharpening operation of the cutting edges of the broach teeth may be carried out automatically, and by the same operation a re-sharpening operation may be performed upon the teeth of the broach which have become dulled from use.

A further object of the invention is to provide in a machine of this character in which the broach to be sharpened or given a step-by-step feeding movement, automatic means controlled by the broach teeth for stopping the feeding movement of the broach at a proper point to be operated upon by a reciprocatory grinding wheel; a further and more specific object in this connection being to provide an operating member adapted to be brought alternately in the path of the forward or cutting sides of the broach teeth, which member is so connected with the control device of the step-by-step feeding mechanism for the broach that it will act to stop the feed of the broach when it is contacted by a tooth.

A further object of the invention is to provide in a machine of this character which has a reciprocatory grinding wheel, automatic means for imparting a reciprocatory movement to the grinding wheel at each stoppage of the broach feeding mechanism and thereafter arresting the reciprocatory movement of the grinding wheel until a succeeding broach tooth has been fed and stopped in cooperative relation with said grinding wheel.

A further object of the invention is to provide simple and effective means for adjusting the angle of the grinding wheel to bring it into conformity with the angle of the broach teeth.

A further object of the invention is to compensate for the taper of the broach to be sharpened by providing simple and effective means for elevating the low end of the broach to bring all of the teeth of the broach in the same relation with the grinding wheel.

In the accompanying drawings:

Fig. 1 is a front elevation of the broach grinding machine.

Fig. 2 is a fragmentary view partly in side elevation and partly in vertical section on a slightly enlarged scale of a portion of the machine as shown in Fig. 1.

Fig. 3 is a fragmentary horizontal section on the line 3—3 of Fig. 2.

Fig. 4 is a fragmentary top plan view of the machine on the same scale as Fig. 1.

Fig. 5 is an enlarged fragmentary front elevation of the machine showing an arrangement of the grinding wheel and electric control devices for one grinding operation.

Fig. 6 is a view similar to Fig. 5 with the parts therein shown in position for another grinding operation.

Fig. 7 is a side elevation of the machine on a slightly enlarged scale as compared to Fig. 1.

Fig. 8 is a fragmentary horizontal section on the line 8—8 of Fig. 7.

Fig. 11 is a partial transverse vertical section on a larger scale on the line 11—11 of Fig. 10.

Fig. 12 is a fragmentary longitudinal vertical section on a reduced scale on the line 12—12 of Fig. 11.

Fig. 13 is a horizontal sectional view on the line 13—13 of Fig. 9 with portions broken away to show certain parts, the view showing portions of the wheel head controlling devices.

Fig. 14 is a fragmentary view similar to Fig. 13 but with certain parts in a different working position.

Fig. 15 is a fragmentary view similar to Figs. 13 and 14, but with certain of the parts in a still different working position as compared to Fig. 14.

Fig. 16 is a perspective view on a larger scale supplementing Figs. 13, 14, and 15 of portions of the wheel head controlling devices in one working position with portions being shown partly in section.

Fig. 17 is a view similar to Fig. 16 but with the parts in a different working position.

Fig. 18 is a view similar to Figs. 16 and 17 with the parts in a still different working position.

Fig. 19 is an elevation of a wheel head hydraulic controlling device.

Fig. 20 is a transverse section on the line 20—20 of Fig. 19.

Fig. 21 is a view similar to Fig. 20 with one of the parts in a different working position.

Fig. 22 is a view partly in elevation and partly in section on a larger scale as compared to Figs. 7 and 9 of a device employed in controlling movements of the work piece supporting means, i. e., an electric switch.

Fig. 23 is a fragmentary section on the line 23—23 of Fig. 22 showing the switch in end elevation.

Fig. 24 is a horizontal fragmentary section on the line 24—24 of Fig. 23 showing a top plan view of the switch.

Fig. 25 is an elevation of a portion of the switch devices shown in Fig. 22 with some of the parts in a different working position.

Fig. 26 is a view similar to Fig. 25 showing the same parts in an ensuing working position.

Fig. 27 is a view similar to Figs. 25 and 26 but with the parts in a still different working position.

Fig. 28 is a front elevation of an electrical device and a portion of its supporting means, the device being the table stopping and head starting switch.

Fig. 29 is a side elevation of the switch.

Fig. 30 is an enlarged front elevation with a small portion in section of the switch with the front cover removed.

Fig. 31 is a view partly in elevation and partly in vertical section of the device shown in Fig. 30, the sectional portion being taken on the line 31—31 of Fig. 30, the view showing the cover in place.

Fig. 32 is a fragmentary side elevation of the lower portion of the device shown in Fig. 30.

Fig. 33 is an enlarged fragmentary front elevation of some of the devices shown in Fig. 1 with the control panel removed and portions of the base broken away.

Fig. 34 is an enlarged fragmentary horizontal section on the line 34—34 of Fig. 33 showing the electro-hydraulic table control devices.

Fig. 35 is a fragmentary view similar to Fig. 33 with a portion of the control panel secured in place; a portion of the view is in longitudinal section.

Fig. 36 is a view partly in elevation similar to Figs. 33 and 35 and on the same scale, and partly in longitudinal vertical section, the sectional portion being taken on the line 36—36 of Fig. 34. The view shows parts in a different working position.

Fig. 37 is a fragmentary transverse vertical section on the line 37—37 of Fig. 34.

Fig. 38 is a fragmentary horizontal section on the line 38—38 of Fig. 37.

Fig. 39 is a schematic illustration of the hydraulic control system, a portion of the diagram being in perspective.

Fig. 40 is a diagram of the electrical controlling circuits.

Fig. 41 is a fragmentary top plan view of a detail, i. e., a work-piece supporting device in the form of a typical magnetic chuck having my improved devices for tilting the chuck to a desired angle.

Fig. 42 is a front elevation of the chuck and tilting fixtures illustrated in Fig. 41.

Fig. 43 is a view similar to Fig. 42 but showing the chuck in a different working position.

Fig. 44 is an end elevation of the left end of the chuck and fixture.

Fig. 45 is an end elevation of the right end of the chuck and fixture.

Fig. 46 is a fragmentary view similar to the left end of Fig. 42 but on a much larger scale, with broken-away portions shown in longitudinal section.

Fig. 47 is a fragmentary view similar to the left end of Fig. 43 but on the increased scale of Fig. 46 with broken-away portions shown in longitudinal section. The view shows the device in a different working position.

Fig. 48 is a fragmentary partial top plan and horizontal sectional view of the left end of the chuck and fixture, the sectional portion of the view being taken on the line 48—48 of Fig. 46.

Fig. 49 is an enlarged fragmentary front elevation of the chuck tilting fixture, showing the graduated collars.

Fig. 50 is a plan view of a typical flat broach.

Fig. 51 is a side elevation of the same broach as seen in Fig. 50, showing in an exaggerated manner the "taper" of the broach.

Fig. 52 is a plan view of a typical flat broach having cutting teeth disposed angularly to provide a shearing cut.

Fig. 53 is a plan view of a typical broach similar to the broach seen in Fig. 52, except that the angularly disposed teeth are of opposite hand.

*Description of typical flat broaches*

Figure 9:
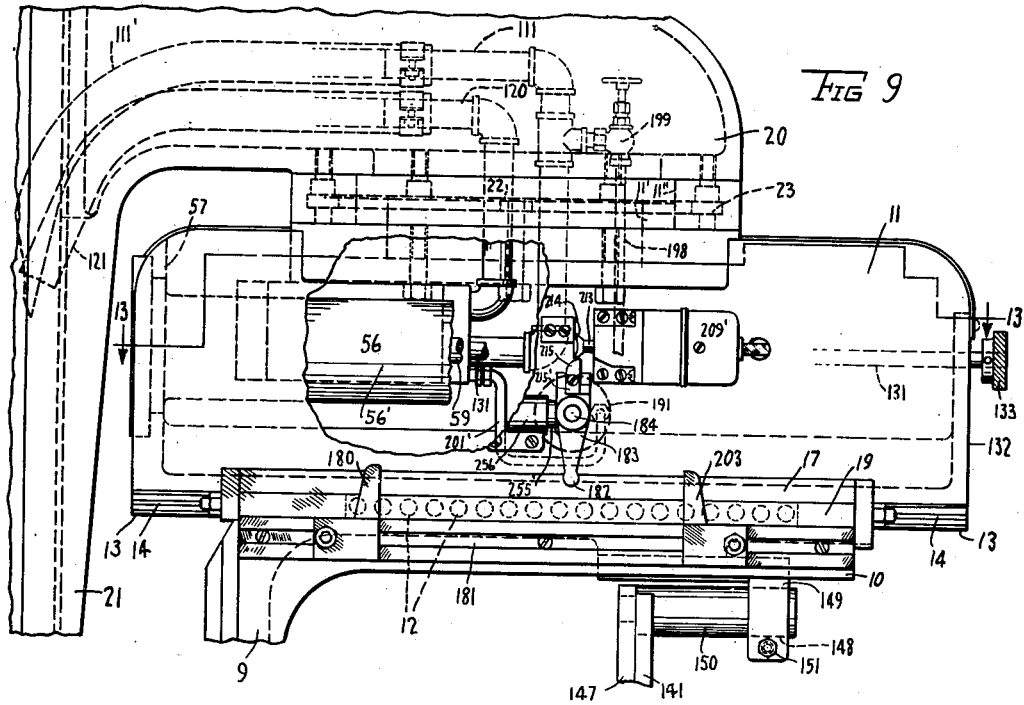
Fig. 9 is a fragmentary side elevation of a portion of the machine on a larger scale, it being a view of a portion of the grinding wheel motor carrying devices.

Referring to the drawings and especially to Figs. 50 to 53, inclusive, typical flat broaches are shown, hereinafter referred to as the work-piece or work. The improved grinding machine of the present application has been designed for the grinding of such broaches in an accurate and convenient manner. Reference is made not only to grinding operations on the teeth involved in the manufacture of new broaches, but also to the sharpening operations on broaches which have become dull in service.

To a certain extent, a flat broach may be likened to a large file, by the use of which in the especially designed broaching machines now employed, a surface such as a boss or face of a pad on a casting, forging or like work-piece may be finished to a commercially satisfactory surface by a single pass of the broach over the work-piece. Flat broaches vary in widths and lengths, and are usually of square or rectangular cross-section. In use, a flat broach is removably secured to the forward side of the ram of a broaching machine, which ram generally is adapted to slide vertically in vertical ways in the broaching machine, a descent from the upper portion and return thereto, being termed the working and return strokes, respectively, of the ram and broach.

Referring to Fig. 50, it will be seen that in the forward side of the flat broach 25 there is formed a series of teeth 24 and in the descent or working stroke of the ram, each successive tooth of the broach engages a casting or forging or the like held in a suitable fixture and removes stock from the same and thereby finishes the surface.

Although the procedure following varies in practice, the casting may be removed at this time, the operator then returning the ram and broach to the upper portion of the ramways in readiness for a following working stroke.

In some instances, the cutting teeth are formed in the broach substantially squarely across the face of the broach, as indicated in Fig. 50. While this formation may serve for some metals, it is more often found that the teeth are formed angularly across the broaches 26 and 27, as seen in Figs. 52 and 53, whereby a shearing action is provided. These views show instances of varying tooth angles 28 and 28', and also how the inclination of the teeth of one broach may be opposite to that of the inclination of another, for the purpose of neutralizing the side-thrust developed by any of a plurality of broaches employed in a multi-broach machine.

Heretofore, the manufacture and sharpening of the teeth of flat broaches has been performed on a variety of grinding machines, substantially all of which are improvised machines and manually operable. Movements by hand of certain elements of the early grinding machines such as the work table, toolhead, etc, may be but slightly slower per movement than is found for corresponding elements in the machine of the present application, when such hand is operated by an experienced operator, yet the experienced operator has difficulty in rapidly and correctly "spotting" the table for the action of the grinding wheel on a particular broach tooth.

It will be explained that by the present electro-hydraulic control system, each tooth is "spotted" more readily than by any hand method, and, further, the uniformly smooth movement imparted to a tool-head by the hydraulic system employed is such than wheel wear is reduced. If wheel wear is excessive in the length of a broach, it may not be possible to provide that the tooth increments of the teeth last ground are as intended, such teeth possibly taking heavier cuts than are contemplated, with the result that tooth breakage occurs, or at the best, the finish of the surface so far as quality is concerned is poorer.

Also, in some of the earlier grinding machines, the capacity of the machine as regards broaches having a shearing cut tooth angle is limited to broaches of comparatively small angle. To grind one having a comparatively large angle, it is often necessary to reset the broach one or more times, with resulting slight errors that affect accuracy and quality of finish obtained.

*General description of machine*

Referring to the drawings, I represents a base on which is slidably mounted a table 2 in a V-way 3 and a flatway 4. On the upper surface of the table is mounted a magnetic chuck 5 with arrangement for tilting by raising one end higher than the other by means of fixtures which will be described later. The grinding wheel 6 is driven by a small motor 6' which is swivelly mounted by means of a dowel 7 in a slide 8. The slide 8 is arranged for movement by a screw 8' and hand wheel 8" thereon in a horizontal direction by a dovetailed slide arrangement (Figs. 2 and 3) in the lower downturned leg 9 of an angular toolhead bracket 10 which in turn is slidably supported on the lower side of a swivel casting member 11. In the present instance the mounting of the tool head bracket 10 for slidable motion with reference to the swivel casting 11 is by means of ball bearings, there being a series of balls 12 on each side (Fig. 11), a central stationary ball race member 13 having a V-groove raceway 14 in each side attached to the lower portion of the swivel member 11. In the upper horizontal portion of the tool head bracket 10 companion raceways 15 are secured, one on each side, the one on the right in Fig. 1 and Fig. 11 being clamped by a retaining bar 16 while the raceway from the left side is clamped by a retaining bar 17 with a taper gib 18 being interposed between the vertical side 19 of the angle bracket 10 in order to provide an adjustment of the pressure of the raceway on the balls to take up for wear.

Figure 10:
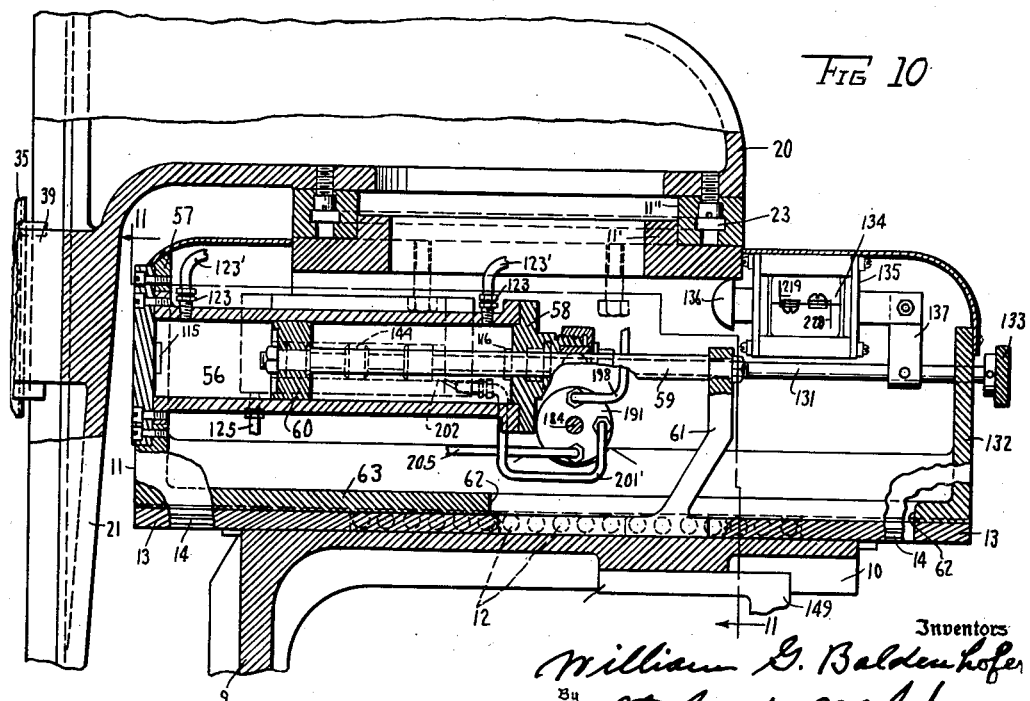
Fig. 10 is a view similar to Fig. 9 partly in elevation and partly in section, the portion in section being taken on the line 10—10 of Fig. 1.

The swivel member 11 is swivelly supported on the under side of the projecting portion 20 of the saddle member 21 by means of T-head bolts 22 whose heads are let into a circular T-slot 23. A hollow boss 11' (Fig. 10) on the upper side of the swivel member fits into a bore 11" in the lower portion of the projecting portion 20, the T-slot 23 being concentrically disposed with relation to the axis of the boss 11'. The boss 11' is preferably of the comparatively large size shown in order to provide that the electrical conductors, conduits and the like essential to the operation of the tool head may pass through this hollow boss.

It is thus seen that the swivel member may be swung from the right or left to the tooth angle as found on the broach to be ground. For example, the tooth angle 28 on the broach 26, Fig. 52, indicates that the swivel 11 should be set to a corresponding angle as shown by the full line position of the member 11 in Fig. 4. A protractor scale 29 is provided to enable the operator to conveniently arrive at the proper setting. Also, for broaches having teeth of the angle 28' as shown for the broach 27 (Fig. 53) or of the opposite inclination, the swivel member 11 is set to the broken line position in Fig. 4. The swivel member is set at right angles to the length of the broach 25 as seen in Figs. 1 and 7.

Tool head elevating and lowering means

In order to adjust the grinding wheel 6 to broaches of different thicknesses the saddle 21 carrying the grinding wheel and motor is slidably mounted on column ways 30 on a column 31, gib angle members 32 (Fig. 4) being employed to secure the saddle to the column ways and tapered gibs 33 being further provided to make the necessary adjustment to take up wear. The column 31 is secured in any suitable manner to a projection 34 of the base 1, Figs. 4 and 7.

The saddle 21 is elevated or lowered by means of an elevating screw 35 suspended at its upper end on a double-row anti-friction bearing 36 (Fig. 7) and radially supported at its lower end on an anti-friction bearing 37 secured in the free end of a bar 38 (Fig. 8) attached to the base 1. Attached to the rear side of the saddle 21 is a nut 39 in which the elevating screw is threaded and to provide transmission of motion from the elevating hand wheel 40, Figs. 1, 4, and 7, a train of gears is employed consisting of a gear 41 pinned to the lower end of the elevating screw 35 and a similar gear 42 (Fig. 8) pinned to the upper end of a short shaft 43 journaled in the base, an idler pinion 44 journaled on a vertical stud 44' being interposed between the gears 41 and 42. On the lower end of the short vertical shaft 43 is a beveled gear 45 (Fig. 7) with which meshes a bevel pinion 46 on the inner end of a horizontally disposed shaft 47 extending through the front of the base and having attached at its forward end the elevating hand wheel 40 previously referred to.

By this means and with the right-hand thread of the elevating screw 35, rotation of the hand wheel in an anti-clockwise direction lowers the saddle 21 and with it the grinding wheel, while rotation in the opposite direction or clockwise elevates the saddle. It will be noticed from Fig. 7 that the projecting portion 20 of the saddle 21 overhangs the work table 2 and the chuck 5 and broach mounted thereon and that the disposition of the swivel casting member 11 is such as to provide fore and aft movement of the wheel over the work.

Hydraulic system

The power for manipulating the work table 2 and the grinding wheel head is by hydraulic motors electrically controlled. Referring to the means employed for providing motion to the work table there is provided a hydraulic motor indicated in general at 48 consisting of a cylinder 49 (Fig. 1) having a cylinder head 50 secured to the base 1, and a cylinder head 51 at the right end of the cylinder through which passes a cylinder piston rod 52. Within the cylinder 49 is slidably disposed a piston 53 on the inner end of the piston rod 52 while the outer end of the piston rod 52 is secured to a bracket 54 attached to the apron 55 of the work table 2.

The tool head receives its motion for traversing the work piece by means of a hydraulic motor indicated in general at 56. The cylinder 56' of this motor is supported at one end on the rear vertical wall 57 (Fig. 10) of the hollow box-like swivel casting member 11 and the forward end of the cylinder is provided with a cylinder head 58 through which passes a piston rod 59 having its inner end fitted with a piston 60. The connection of the piston rod 59 with the tool head bracket 10 is by means of an offset bracket 61 secured by screws or otherwise to the upper surface of the wheel head bracket 10, this bracket passing through an elongated slot 62 (Figs. 13, 14, and 15) in the bottom horizontal portion 63 of the swivel member 11.

The hydraulic fluid supplying motion to each of these pistons is provided by a hydraulic system shown in Fig. 39, which figure shows the piping diagram of the entire hydraulic system. A suitable pump shown conventionally at 64 may be driven by any means such as the electric motor 65. To the suction side of the pump 64 is connected the suction conduit 66, the lower end of which extends into the tank 67 housed in the hollow interior of the base 1. From the discharge side of the pump 64 a conduit 68 leads to the first of a pair of pressure regulator valves, it being preferable to provide that part of the system i. e., the table moving portion, is operated at one pressure and the other part operated at a much lower pressure. In the present instance the first regulator 69 supplies fluid through a conduit 70 to the work table master valve body 71 at a pressure of say 250 pounds per square inch and the excess or the difference between the pressure supplied by the pump and the pressure supplied to the work table master valve 71 is discharged through a short conduit 72 to the second of the pressure regulator valves 73 which regulates the pressure flowing to tool head throttle valve 74 through the conduit 75 and from this tool head throttle valve 74 directly to the tool head cylinder 56. The pressure supplied by the second regulator valve 73 may preferably be in the neighborhood of 40 pounds per square inch and the surplus fluid is discharged again to the tank by means of a conduit 76.

Fluid is supplied to each end of the table hydraulic motor 48 by conduits, there being a conduit 77 connecting the left side of the work table master valve body 71 with the right end of the table cylinder 49 and a conduit 78 connecting the right end of the master valve body 71 with the left end of the table cylinder 49. A more detailed description of the work table master valve body follows: Referring to Figs. 33 to 37, inclusive, there is shown the work table valve body 71 previously referred to which is located horizontally within the interior of the base 1, there being a large opening 1' in the forward wall of the base 1 to provide access to the valve body 71. Slidably disposed for reciprocating movements is the table control piston valve 79. This control valve 79 may be manually reciprocated or as will be described, by electrical means, in the present case by solenoids. The control valve 79 consists of three enlarged diameter spools preferably integrally attached to a rod 80, the ends of which 80' and 80" extend on each side beyond the valve body 71.

Centrally located in the upper portion of the valve body 71 is a port 81 by which communication with the conduit 70 is made to thereby bring fluid under pressure to the central spool 79' of the work table control valve. The width of the port 81 is proportioned to the breadth of the central spool 79' so that when the control valve 79 is at neutral position as shown in Fig. 35 admission of fluid is stopped by the central spool.

In communication with the horizontal bore in which the control valve 79 reciprocates is a pair of ports, one of which on the left and indicated at 82 communicates with the conduit 77, while the other 83 on the right hand side communicates with the conduit 78, the conduit 77 leading to the right end of the table cylinder 48 and the conduit 78 leading to the left end of the table cylinder 48. At 84 and 85 respectively on the left and right of the control valve body 71 are exhaust ports leading to a common exhaust cavity 86 horizontally disposed in the rear portion of the control valve body 71, Fig. 38, from which leads a conduit 87 directly to a throttle valve 88 whereby the work table is controlled, both as to starting, stopping and speed thereof. The reason for placing the work table throttle valve 88 in the exhaust line will be explained later. All exhaust fluid passing through the throttle valve 88 is conducted by a conduit 89 preferably through an oil purifier 90 (Fig. 30) of any suitable type and from the oil purifier through a conduit 91 returning to discharge into the tank 67 through the foot valve 92, by means of which a slight back pressure of say 4 pounds to the square inch is built up in the conduit 91. This is done in order to provide lubrication for the work table ways 3 and 4, and also to prevent undesired drainage of fluid from the cylinder and connected piping. The conduit 91 is branched at the point 94 to provide the conduit 95 leading to the table ways, a valve 93 being interposed therein to control passage of the fluid to the ways.

*Manual control of table movement*

To provide for manual control of the table, the main control valve 79 is actuated mechanically by a hand lever 96 positioned in a generally horizontal location on the forward side of the base 1. The lever 96 is secured by pinning or other means to the forward end of a short cam shaft 97 (Fig. 34) horizontally disposed and journaled in a bracket 98 secured to the forward side of the base, the cam shaft passing interiorly through an opening in the base.

On the inner end of the cam shaft 97 is secured a cam 99 substantially in line with the table control valve 79. The lever 96 may be placed in any one of three positions and is preferably locked by the insertion of a spring-pressed plunger 100 into any one of three arcuately disposed openings (Fig. 35) in the panel 101 which covers and protects the valve arrangement. When placed in the central opening 101' the effect is to cause the control valve 79 to assume the central or neutral position, in which position the table will not move. By moving the lever 96 upwardly to the full line position, Fig. 36, the plunger 100 entering the upper opening 101", the table will move to the right by hydraulic power. By placing the lever 96 downwardly to the dot-dash line position, the plunger 100 entering the opening 101''', the table will move to the left, also by hydraulic power.

To obtain these movements, the cam is connected mechanically with the control valve 79 through the medium of the armature 102 of a solenoid arrangement 178 to be described more fully in connection with the explanation of the electrical control circuit. For the present, it is stated that for convenience, this particular solenoid 178 is secured to the left-hand end of the valve body 71 whereby the solenoid armature may be directly connected to the extension 80' of the control valve 79, and it is therefore convenient to actuate the valve 79 through the connection of the cam 99 with the armature.

The camming surfaces by which these movements are produced are milled in the flat extending portion of the cam so as to provide that the camming surfaces are substantially tangentially disposed with relation to the axis of rotation of the cam shaft 97. Secured to each side of the armature 102 is a strap 103, these straps extending through the left end of the solenoid 178 and straddling the cam 99. Secured in the left-hand end of the straps 103 and passing through the opening in the cam whose outlines form the camming surfaces is a pin 104.

As can be seen from Fig. 36 if the control lever 96 is moved to the full line position that portion of the camming surfaces indicated at 106 will have contacted the cross pin 104 and will have cammed the entire valve and solenoid armature arrangement to the left as shown in full lines, whereby fluid under pressure will be admitted from the port 81 through the valve bore and into the port 83 to the left end of the table hydraulic motor 48 to move the table to the right by hydraulic power. Also, if the control lever 96 is moved downwardly to the dot-dash position, Fig. 36, the cam surface indicated at 108 in the control cam 99 will move the valve and solenoid arrangement to the extreme right end of the valve travel as indicated by dot-dash lines. During the time the table moves to the right, the exhaust fluid flowing from the right-hand end of the table hydraulic motor 48 flows through the conduit 77, port 82 and through the valve bore to the exhaust port 84 to the common exhaust port 86. When the table control lever 96 has moved the valve to the dot-dash line to produce table movement to the left, the left end of the table hydraulic motor 48 is in communication with the exhaust conduit through the port 83 and through the valve bore to the exhaust port 85, and thence to the common exhaust port 86.

Between these extremes of movement as produced by the cam in manual operation and whereby the table may be moved from right to left, or left to right, at any speed desired under the control of the table throttle valve 74, there is a mid point associated with a central positioning of the lever 96. When the control lever 96 is placed in this central position as shown in Figs. 33, 34, and 35 that portion of the camming surfaces indicated at 109 provides that the valve 79 assumes the central or neutral position. It will be noticed, however, that a movement of the valve 79 to the right is possible because of the fact that in the cam there is provided a recess 110, Fig. 35, opposite to the neutral surface 109, whereby the valve 79 may make one-half its stroke to the right. This half stroke movement is provided for in this manner in order that electrical control of valve movement may take place when it is desired that automatic broach grinding be performed in the grinding machine.

Tool head hydraulic system

Referring again to the piping diagram in Fig. 39, the fluid under pressure has been described as reaching the wheel head hydraulic motor 56 under control of the hand throttle valve 74 through a conduit 111 in which is interposed, preferably at some point within the hollow interior of the column 31, a length of flexible conduit here indicated conventionally at 111', this being done in view of the fact that in swivelling the wheel head to various tooth angles, the change of position of the tool head is made possible by the flexible conduit arrangement. The conduit 111 communicates with the central port 112, Figs. 13, 14, and 15, in direct communication with a valve bore 113 in which is slidably fitted a valve 114 very similar in its shape and performance to the table control valve 79 previously described. As shown in Fig. 13 the valve 114 is in a central or neutral position and thereby blanks the supply port 112 whereby fluid is not admitted to either end of the wheel head hydraulic motor 56 and the wheel head 10 will be at rest. On the left side of the central port 112 will be found a port indicated at 115 leading to the rear or left end of the cylinder 56' while on the right side there is provided a port 116 leading to the right or front end of the cylinder 56'. Exhaust ports indicated at 117 and 118 are in communication with the valve bore 113 and the common exhaust passage 119.

From the exhaust passage 119 a conduit 120 known as the wheel head exhaust conduit is led which also has interposed in it a flexible metallic section 121, Fig. 39, whereby the exhaust fluid from the wheel head cylinder 56 is conducted to the tank 67.

There is preferably provided a foot valve 122 attached to the lower end of the conduit 120 for the purpose of preventing undesired drainage of fluid from any part of the tool head cylinder and connected piping. The foot valve 122 is set to provide a comparatively low back pressure say four pounds to the square inch, by means of which valve the entire upper system remains flooded with fluid at all times and prevents an influx of air into the system as would happen if the fluid level falls for any reason, it being explained that the operation of the machine, particularly when engaged in automatic grinding cannot be satisfactorily carried on with air in the system. As a further means of preventing accumulation of air in the tool head hydraulic motor 56 automatic air bleeders are provided consisting of a pair of fittings inserted in the extreme upper ends of the cylinder 56'. Since air travels to the highest point in the cylinder, these fittings, which are simply screwed fittings with a very small orifice, dispose of the entrapped air by passing such air outwardly along with a very small quantity of fluid. This fluid and air are conducted by the branched conduits 123 to a common return line 124 into which also drains a conduit 125 in communication with the rear end of the valve bore 113 of the wheel head cylinder 56' whereby any leakage from the valve bore is returned to the tank.

In the present instance the conduit 124 carrying this drainage and bled fluid to the tank is shown as having a flexible conduit 124' for the same reason as shown for the other flexible conduits.

The table hydraulic motor 48 is freed of any entrapped air in much the same manner as there is provided a conduit 126 leading from the extreme upper left end of the table cylinder 49 to a valve 127 and a conduit 128 connected at the extreme upper right hand end of the cylinder leading to a valve 129. To the discharge sides of these valves 127 and 129 a common line 130 is connected and is led to the tank 67. Due to the peculiarity of the operations it is not desired to provide automatic bleeders for the work table hydraulic motor and consequently this motor is relieved of any entrapped air from time to time by manually opening and closing the valves.

Electro-hydraulic control of tool-head

In the present instance the tool-head of the broach grinder is not manually operated except by controlling the positions and movements of the tool-head control valve 114 when setting up the machine for a particular job. In automatic broach grinding or sharpening, the cycle of operation of the tool-head is that the tool-head is moved from a rearmost position, where the wheel is at the rear of the work and clearing the same as shown in full lines in Fig. 7, forwardly across the work so the grinding wheel will engage the work, to the position shown in broken lines, Fig. 7, reversing from that position and returning to the full line position and stopping. The stoppage at the rearmost position is for the reason that after one cycle is made the table must move up to present the next tooth for the action of the grinding wheel. It is obvious that during the time the work-piece is moving for a new setting, the wheel must remain stationary in its rearmost position. The manner in which the tool-head movements are controlled will be explained first, after which the manner in which the table movements are made will follow. It will be seen that the table movements are successive intermittent movements in one direction, the table remaining absolutely stationary while a tool head cycle is in progress.

Referring again to Figs. 13, 14, and 15, the position of the tool head control valve 114 at the time when the grinding wheel is in its rearmost position is shown in Fig. 13 as being in the neutral or central position whereby the supply port 112 is blanked by the control valve 114 and thereby permits of no fluid to flow to either end of the tool-head hydraulic motor 56.

For manual operation of this valve, its stem is extended as at 131 through an opening in the forward vertical wall 132 of the swivel member 11, terminating in a knob 133. Forward movement (to the right) of the stem 131 brought about by any cause, such as by manual means or by the electrical means to be described, moves the valve 114 to the right to the position shown in Fig. 14, thereby admitting fluid from the supply port 112 to the port 115, and at the same time connecting the port 116 with the exhaust port 119. The pressure of the fluid on the left side of the piston 60 causes the tool head bracket 10 to move to the right, to any intermediate position desired by the operator, or entirely across the broach to the broken line position as shown in Fig. 7 in reference to the outline of the wheel and its motor. Motion of the valve 114 rearwardly or to the left as shown in Fig. 15, which motion is caused partly by a reversing dog and also by hydraulic means as will be explained, causes the reversal of the tool-head bracket 10, since for this motion, the supply port 112 is put in communication with the port 116 to apply fluid pressure to the right side of the piston 60, and at the same time to put the left end of the cylinder 56' in communication with the exhaust port 117.

*Automatic electro-hydraulic control of tool-head*

In order to control these movements automatically this valve is moved during part of the cycle by electrical means, that is, a solenoid, and at other parts of its stroke by hydraulic means under the control of a second hydraulic valve to be described. This combination of electric and hydraulic means is employed in order to provide that one cycle only is made and that the tool head will remain in its rearmost position until a new cycle is begun. The tool-head is started automatically by means of an electrical impulse impressed on the solenoid device 134 located within the hollow box-like interior of the swivel member 11 and supported to the wall of this member by a bracket 135, the armature 136 of which solenoid is connected directly to the valve extension 131 by the arm 137 (Figs. 13 to 18, inclusive).

The electrical impulse is preferably an instantaneous application of current following the closing of a sensitive switch known as the table stopping and head starting switch device so positioned that the lower end of its actuating mechanism is placed directly in the path of the broach teeth. It is essential to stop the broach with each succeeding tooth in exactly the same relation to the grinding wheel as the preceding tooth so that the same amount is removed from each tooth regardless of the spacing of one tooth to another.

It is also stated that one of the advantages of the particular design and method of supporting the table stopping device is that the tooth that is to be ground is the tooth that is contacted by the table stopping device, thereby permitting that the spacing of the teeth of broaches may vary for any reason. For example, the broach may have a series of roughing teeth of one spacing and a final series of finishing teeth of another spacing, and often the spacing varies from end to end of a series. Also, it is possible to provide gaps between series, and when a gap occurs the table continues its movement until the next tooth is encountered thereby setting a new cycle in operation.

*Table stopping and tool-head starting switch*

The table stopping and head starting device is shown in detail in Figs. 28 to 32, inclusive, Fig. 30, showing the device on a larger scale with the cover removed while Fig. 31 which is a vertical section on the line 31—31 of Fig. 30 includes the cover and a portion of the supporting arms partly in section and partly in elevation. This device consists of a sensitive, normally open, switch actuated by a system of leverages. The complete device is adjustably supported on the wheel head bracket 10 and thereby moves with the bracket 10. In order to stop the table the broach teeth make contact with an exposed portion of the leverage system, thereby closing the switch, and as this is accomplished by a swinging movement of a lever to be described, the device must be so supported that the swinging movement takes place in the longitudinal plane of the broach. Further, since the table must not move while the grinding wheel is in contact with the work, it is necessary to so adjust the switch device that the grinding wheel will be clear of the work before the broach teeth make contact with the leverage system. This position of adjustment is shown in Fig. 7 in full lines while the position of the grinding wheel and the table stopping device is shown in broken lines at the completion of the forward stroke.

The switch casing is a shallow cylindrical cup-like casing 138 open on one side and provided with a cover 139 which closes this side when in place, on which cover 139 (Fig. 31) there is provided a cylindrical boss 140, whereby the device is attached to the wheel head bracket 10. An adjustably positioned clamping arm 141 having an opening 142 of such size as to snugly fit the boss 140 is provided, this arm being split as at 143 to provide that the clamping bolt 144 will clamp the device firmly in the arm 141 to the position desired. The upper end of this arm 141 is adjustably secured by means of a bolt 145 and hand wheel 146 (Fig. 7) to the free end of a depending arm 147 (Fig. 5) adjustably secured in an opening 148 in an angle member bracket 149 (Fig. 9) secured to the lower forward side of the wheel head bracket 10, there being a laterally-extending cylindrical shaft 150 (Fig. 5) integrally attached to the upper end of the arm 147 for insertion in the opening 148 of the angle bracket 149. A clamping screw 151 is provided in the lower end of the angle bracket 149 to secure the arm and switch device in the desired position.

Mounted within the interior of the casing 138 is secured a switch of the normally open type indicated conventionally at 152, Fig. 30, and also in Fig. 40 which is a wiring diagram of the electrical circuit. Although the showing of this switch 152 is as a typical normally open switch, it should be stated that in order to provide the necessary accuracy of table movements this switch should be of a sensitive type.

The switch consists of a contact 153 to which electrical power is supplied through a conductor 154 and a second electrical contact 155 from which electrical power is carried by conductors 156, the switch member by which the contacts are bridged being indicated at 157. The switch member is moved upwardly to close the circuit by the action of the leverage to be described, there being a horizontally-disposed bar 158 pivotally mounted on a pin 159 secured in a casing 138 and resting normally against the stop pin 160 and being urged to contact with this pin by a small spring 161. Upward motion of the free end of this bar 158 as shown in dot-dash lines produces an upward motion of the switch plunger 162 whereby the member 157 completes the circuit between the contacts 153 and 155.

The bar 158 derives its upward motion to close the circuit by the camming action of the upper end of a double-armed lever 163 pivotally mounted so as to swing in a plane parallel to the longitudinal axis of the broach. The pivotal points of this swinging action of the double-armed lever is provided by the conically pointed opposed screws 164 which are threaded in the ears 165 on the lower side of the switch casing 138. The lever 163 normally is urged by a coil spring 166 to rest against a stop pin 167 secured to the casing 138 as is shown in full lines in Fig. 30. When swung to the dot-dash line by contact of a broach tooth as will be explained the extreme upper end 168 of the lever 163 makes contact with a shoulder 169 on the horizontal bar 159, and cams this bar to the position shown in dot-dash lines, thereby closing the switch 152.

Inasmuch as the swinging movement of the double-armed lever 163 closes the switch, and not only stops the table, in a manner to be described, and also starts the head on its outward stroke, it follows that to actuate the lever 163, an exposed portion of the mechanism must be so positioned as to be in the direct path of the teeth of the broach, Fig. 7. When the wheel head bracket 10 starts on its forward stroke the tooth contacting means slides along the broach tooth to be ground and as soon as clear of the broach the coil spring 166 returns the double-armed lever to its normal position against the stop pin 167, Fig. 30, incidentally opening the switch 152 and preventing a return of the table stopping device to the same tooth space. On the inward stroke the tooth contacting means eventually again makes contact with the broach at some other point, and in order to prevent breakage, the lower end of the double-armed lever 163 is provided with an outwardly-swinging member 170, Fig. 32, the swinging member being shown in full lines as having come in contact with the broach and resting on some portion of a broach tooth. The normal position of the swinging member 170 is shown in this figure in dot-dash lines, and is held in this position by a small spring 171 against a depending lug 172 on the extreme lower end of the double-armed lever 163. The means for providing the pivotal points for the swinging member 170 is by the use of conically-pointed screws 173 threaded in ears 174 forming the upper portion of the swinging member 170.

In view of the abrasion produced in making contact with broach teeth and in sliding off of them, the lower end of the swinging member 170 is preferably provided with a hardened plate 175. It will be seen that the switch 152 is not actuated by the swinging movement as described for the member 170, even though this member may be resting on the upper portion of a tooth, but as soon as the table begins to move the action of the spring 171 is to cause the swinging member 170 to assume its normal position as shown by the dot-dash lines in Fig. 31 to thereby be in readiness to again close the switch as soon as acted upon by the next succeeding tooth of the broach.

The closing of the switch 152 as described impresses an electrical impulse upon a relay 177 which as previously stated affects two separate circuits, one of the circuits containing the solenoid 134, and the other, the solenoid 178, the purpose of which latter will appear later. As mentioned, the solenoid 134 is by its armature 137 directly connected to the valve stem extension 131 of the wheel head cylinder control valve 114. An application of current, therefore, moves the valve 114 to the right as shown in Figs. 7, 14, and 17, and thereby admits fluid under pressure to the left end of the wheel head cylinder 56'. The wheel head moves outwardly on its stroke until the grinding wheel has moved completely across the work, when the stroke is then at its forward end and reversal takes place in the following manner:

Hydraulic reversal of the tool-head

Referring to Figs. 7 and 9, reversal at the completion of the outward stroke is brought about by the contact of a reversing dog 180 adjustably positioned in a T-slot bar 181 secured to the upper longitudinal edge of the wheel head bracket 10 with the lower end 182 of a double-armed lever 183. This lever 183 is secured by any means to the end of a shaft 184 journalled in the sides of the swivel member 11 and extends across the swivel member 11 transversely disposed to the longitudinal axis of the cylinder 56'. On the end opposite the double-armed lever 183 there is secured a hydraulic valve arrangement, the purpose of which will appear. The immediate purpose of the cross shaft 184 is to move the valve 114 from the position as shown in Fig. 14 to a neutral position whereby outward movement of the wheel head is stopped. This function is accomplished by providing a mechanical connection between the cross shaft 184 and valve extension 131 in the nature of an upwardly extending forked lever 185 secured to the shaft 184, the upper end of this lever being forked to provide the ears 186 which straddle from below the valve extension rod 131, Figs. 16, 17, and 18. On the valve extension 131 are provided collars 187 and 188, adjustably secured to the extension 131. As can be seen from Fig. 13 the collar 188 is so placed as to make contact with the forward side of the ears 186 of the lever 185 when the same is in a vertical position, at which time the valve 114 is in its central position. It will be remembered that when the valve is in the central position the wheel head is at rest.

To start the wheel head on its outward stroke the solenoid 134 moves the valve forwardly or to the right, as in Figs. 7, 14, and 17, and to prevent a movement of the lever 185 at this time the collar 187 is secured to the valve extension 131 at some distance from the ears 186 so as to form a gap indicated at 189 (Fig. 13 only) between the rear sides of the ears 186 and the collar 187, the extent or length of this gap being substantially one-half the total travel of the control valve 114. The forward movement of the valve 114 under the action of the solenoid 134 then can take place, bringing the collar 187 substantially in contact with the ears 186 of the lever 185 and establishing the gap 190 (Figs. 14 and 17) equal in length to the gap 189. Thus, no disturbance of the hydraulic valve now to be described is caused.

The hydraulic valve consists of a casing 191 having a bore 192 to receive the cross shaft 184 and a concentrically disposed enlarged bore 193 in which the valve proper 194 is fitted, the valve portion 194 being preferably an integral part of the rod 184. The valve 194 is provided with a tangential groove 195 and thereby communicates with ports to control the admission and exhaust of fluid to actuate the control valve 114 in one direction.

Referring to Fig. 16, a radially disposed port 196 is shown, in communication with which is an axially disposed passage 197 whereby fluid under pressure is received from conduit 111 through a conduit 198 which supplies fluid to actuate the wheel head hydraulic motor 56. In the conduit 111 there is placed a valve 199 (Figs. 9 and 39) to control the fluid passage to the hydraulic valve 194. In the position of the valve 194 in Fig. 16 the supply port 196 is closed.

In Fig. 18 the position of the parts has been changed by the action of the wheel head reversing dog 180 (Figs. 25 and 26) upon the lower end of the lever 183 whereby first, the valve 114 is moved mechanically to its central position because the ears 186 are at this time directly in contact with the collar 187. Therefore, outward movement of the wheel head ceases. By the same action the valve 194 is turned (Fig. 18) so that the supply port 196 now furnishes fluid through the tangential groove 195 to a radially-disposed port 200, Figs. 16, 20, and 21, from which an axially-disposed passage 201 leads by a conduit 201' (Figs. 9 and 39) to the space 202, Figs. 12 and 14, at the right end of the bore in which the valve 114 is fitted whereby the valve 114 is moved to the left by hydraulic power for the remaining half of the valve stroke, as shown in Fig. 15 in full lines, and by broken lines in Fig. 18. This latter movement of the valve 114 by hydraulic power is the actual reversal movement whereby the wheel head is caused to move to the rear to complete this portion of the wheel head cycle.

In the movement of the valve 114 from the central position just mentioned to the position shown in Fig. 15, the collar 188 comes to rest closely adjacent the right side of the ears 186, eliminating the gap 190 and re-establishing the gap 189 as shown in broken lines in Fig. 18; thus, when the wheel head is to stop at the rearmost position, the stopping dog 203 adjustably secured to the T-slot bar 181, Fig. 7, strikes the lower end 182 of the lever 183 and, since the collar 188 is now closely adjacent the forward side of the ears 186 of the lever 185, the valve 114 is restored to its central position, Fig. 13, but no further, as the power that moves the valve comes from wheel head movement itself, and the head cannot move with the valve at its central position. This is again the position seen in Fig. 16, whereby the wheel head is at rest, the gap 189 being re-established for a succeeding movement of the valve by the solenoid 134. In moving the valve 114 from the position shown in Fig. 14 to the position seen in Fig. 13, the fluid in the space 202 is exhausted through the conduit 201', through the port 200, and through the tangentially-disposed groove 195 to the exhaust port 204, Figs. 17, 18, and 20, and axially-disposed passage 204'. The fluid thus exhausted returns to the tank 67 through the conduit 205, Fig. 39.

*Table starting switch and actuating means*

During the final movements of the wheel head to the rear, the action of the wheel head stopping dog 203 in changing the position of the wheel head reverse mechanism also actuates a table starting switch indicated in general at 209' whereby the table control valve 79 is moved to the right to cause the table to move to the left. This switch may be of any suitable type but momentary contact only should be made and should be actuated by mechanism which will provide the contact in one direction of movement of the mechanism and not upon the reverse direction. Referring to Figs. 9 and 22 to 27, inclusive, the switch contacts are shown at 207 and 208. A circuit is made across the contacts by the movement of a bar 209 preferably of insulating material and carrying contacts 210, 211, these latter contacts being connected by short cable 212. The bar 209 is slidably mounted on a plunger 213 which has a head 214 arranged in the path of pawl 215 pivotally mounted on the upper end 216 of the lever 183. Fig. 22 shows the position of the parts when the wheel head is at its extreme rear position. Fig. 25 shows so much of the device illustrated in Fig. 22 as is necessary to explain that on contact of the dog 180 with the lower end 182 of the lever 183 that the pawl 215 passes under the head 214 of the switch plunger 213. In Fig. 26 the outward stroke is completed and the pawl 215 has passed the head 214 and by reason of the weighted lower end 215' the pawl swings by gravity into operating position.

Just prior to completion of the rearward stroke the dog contacts the lever 183 and moves it to a position shown in Fig. 27, in which it will be seen that the pawl is in contact with the head 214 and due to the lug 183' on the upper end 183'' of the lever 183, the pawl 215 cannot swing in this direction, and therefore the switch bar 209 is moved so that the contacts are closed and electrical circuit established. The slight remaining portion of the returning stroke of the wheel head causes the pawl 215 to slip under the head 214 and allow the switch to open by the action of the coil spring 216 on the switch plunger 213, the parts returning to the position shown in Fig. 22.

*Table starting solenoid arrangement*

The current impulse produced by the momentary closing of the table starting switch just described affects a relay 217, Fig. 40, to admit a momentary application of current to the table starting solenoid 218. This solenoid 218 is secured to the right-hand end of the table control valve housing 71, Figs. 33 to 36, inclusive, and by the direct connection of its armature 218' with the right extension 80'' of the control valve 79, moves the valve to the right as shown in dot-dash lines in Fig. 36. This permits fluid to flow from the port 81 through the conduit 77 to the right-hand end of the table hydraulic motor 48 to produce movement of the table toward the left, it being the practice to place broaches on the machine with the teeth pointing to the left as seen in Figs. 1, 4, 5, and 6. As has been described previously the table stopping and head starting switch comprising the switch 152 in the casing 138 is so adjustably secured as shown in Fig. 7 as to be in the direct path of the broach teeth when the wheel head is at its rearmost position. Accordingly, when the table starting solenoid 218 moves the valve to the right and causes the table to move to the left a tooth will come in contact with the trigger member 170 and will thus swing the double-armed lever 163 to the dot-dash position as shown in Fig. 30 to close the switch 152 as described.

The closure of this switch affects the relay 177 and provides that current flows to the solenoid 178 previously mentioned and known as the table stopping solenoid. Current in this solenoid 178, the windings of which are illustrated diagrammatically at 178', Fig. 36, acts to draw the table control valve 79 from its extreme right position to the left until the cross pin 104 strikes the portion of the cam indicated at 109, Fig. 35, which when the hand-controlled lever 96 is in the position shown in Fig. 35 limits the movement of the valve 79 to its central or neutral position as shown in Figs. 33 and 35 and table movement stops immediately.

*Wiring diagram*

The line conductors furnishing power to the electric system, Fig. 40, are indicated at 219 and 220. Leads from these lines carry current as follows: A lead 221 carries current to one side of the table starting solenoid 218. A short lead 222 carries current to the movable contact member 223 of the relay 177. As shown the power line 220 may end at the contact 208 of the table starting switch, Fig. 22. The power line 219 is led to one side of the head starting solenoid 134, and may also branch as at 219' and be led to one side of the relay 217, thence from this solenoid as at 219" to the contact 207 of the table starting switch, Fig. 22. A short conductor 224 branches from the power line 219' near the solenoid 217 and carries current to the movable contact member 225 and from this member a conductor 226 carries current to the other side of the solenoid 218. From the contact 227 of the relay 177 a conductor 228 carries current to the other side of the solenoid 134 and by a conductor 229 to the table stopping solenoid 178, from which a conductor 230 leads to a power line 219.

Previously mentioned conductors are the conductor 154 carrying current from the conductor 220 to the contact 153 of the table stopping and wheel head starting switch 152 and the conductor 156 leading from the contact 155 of this switch to one side of the relay 177. From the other side of the relay 177 a conductor 231 is led to the power line 219'. A manually operated simple push-button type switch indicated in general at 232 is provided for a purpose to be explained later, conductors 233 and 234 carrying current to and from this switch.

The circuits for the grinding wheel, pump motor or other electrical circuits not relating to the control of the movements of the machine are not included in the wiring diagram.

*Tilting chuck fixture*

Practically all broaches of the flat type are thinner at the starting end than at the finishing end of the broach, for the reason that each succeeding tooth should stand out beyond the preceding tooth by a small increment 25' in order to remove its share of the stock in machining the work-piece. This requirement is shown in somewhat exaggerated form in the several figures relating to typical broaches and is also noticeable in the exaggerated representation of the broach 25 in Fig. 51, as it can be seen that the end 235 of the broach 25 is thinner than the end 236. The difference in thickness 25" is the amount of stock that would be removed from a work piece in passing the broach 25 over the work piece for its full length, and if correctly ground each tooth will take its share of the total stock removal.

In order to provide that each tooth of the broach can be ground with a single setting of the grinding wheel, it is preferable that the broach be supported in such manner as to bring the tooth levels to a line parallel with the table ways. This is accomplished in the present instance by providing suitable fixtures for the magnetic chuck 5 whereby the left-hand end of the chuck 5 is elevated.

In the normal position of the chuck the upper chuck surface 5' is exactly parallel to the table surface. In this normal position the right hand end of the chuck rests upon a cylindrical fulcrum bar 237 and is clamped thereon by a clamp 237', while the left-hand end rests upon the upper edge 238' of a yoke fixture 238 which straddles the left-hand end of the chuck body. The left end of the chuck is elevated, fulcruming on the fulcrum bar 237 by the action of a wedge block 239 having an inclined face 239', this block being adapted for sliding motion on the upper surface 240 of the yoke fixture 238.

A spline key 241 in the lower surface of the wedge block 239 preserves the alignment of the wedge block by its cooperation with a key-way 241' in the yoke fixture 238. Movement of the wedge block toward the chuck is effected by a screw 242 threaded in the wedge block 239. The screw 242 has a shank 242' journaled in the rear wall 243 of the yoke fixture 238 and terminates in a squared end 244 in order to rotate the screw by means of a wrench. An integral collar 245 on the screw 242 resists the rearward thrust of the wedge block. Coacting with the inclined face 239' of the wedge block is a roller 246 journaled on a pin 247 carried in a block 248 secured to the left-hand end of the chuck. In each jaw 249 which straddles the left end of the chuck is a slot 250 through which a screw 251 passes, this screw being threaded into a tapped hole in the chuck body. By loosening the screw 251 and rotating the screw 242 in the proper direction the wedge block coacts with the roller 246 to elevate the left end of the chuck and when elevated to the proper height the screws 251 may be tightened.

Figs. 43 and 47 show the left portion of the chuck when substantially the extreme elevation has been given. If the taper of the broach is known the chuck may be elevated or tilted to the exact height by the use of suitable graduations 252 on the collars 253 and 254 on the screw shank 242'.

In order to insure that the lever 183 will return to the position shown in Fig. 22 from the extremes of its movement as shown in Figs. 25, 26, and 27, thereby also insuring that the hydraulic valve 194 will be returned to its normal position, there is provided a flat ended plunger 255, Figs. 23 to 27, inclusive, slidably mounted in a barrel 256 mounted on the side of the swivel member 11. The barrel 256 is so positioned that the plunger 255 bears against the flat side 183" of the lever 183, being urged against this lever by the coil spring 257 carried within the hollow bore of the barrel. As may be noticed in Figs. 25 and 26 the pressure of the spring against the plunger 255 is exerted against that portion of the lever 183 above the horizontal center line resulting in a tendency to return the lever 183 to the vertical position. Referring to Fig. 27 it may be seen that the same tendency exists since here the tendency of the plunger to return the lever 183 to a vertical position results from its contact with the lever 183 below the horizontal center line. By the action of this spring-pressed plunger in restoring the lever 183 to a normally vertical position, it is insured that when the wheel head is in a state of rest at its rearmost position, the hydraulic valve 194 will also be in its normal position whereby the space 202 is connected to the exhaust, permitting free movement of the valve 114 manually or otherwise.

*Operation*

If the taper of the broach is known the chuck 5 may be tilted as just described to the desired angle and the broach placed in position on the upper surface of the chuck. If the taper is not known indicating means of any nature may be used to determine that the tooth levels are parallel with the table. Two separate operations are usually performed in the manufacture or sharpening of a broach, one of which is known as gumming which means that the cutting face 24' of a tooth is to be ground, preferably by a disk type wheel formed to the contour of a tooth space. In Fig. 1 the machine is shown set up for the gumming operation, the grinding wheel motor housing being swivelled to the nearly horizontal position required. In gumming, the positive rake indicated by the inclination of the cutting face 24' preferable in cutting certain metals is conveniently obtained. The other operation is known as the backing-off operation, by which is meant that the land 24" of the tooth is to be ground. This operation is preferably performed with a cup-wheel. The arrangement for producing the backing-off operation is shown in Fig. 6, the cup wheel being indicated at 6". The gumming operation only is considered in the first part of the description of the operation of the machine, an explanation of the backing-off operation following.

If the teeth of the broach are angularly inclined, as is often found since shearing action tooth formation is preferred for such metals as steel, the swivel member 11 is loosened and turned to the proper angle and again tightened at this setting. With the grinding wheel at a suitable elevation above the work to insure a clear passage thereover, a few preliminary strokes are made for the purpose of correctly setting the tool-head stroke dogs 180 and 203, after which the tool-head may be allowed to return to its rearmost position where it will stop. While at this rearmost position and clear of the work, the saddle is lowered until in the judgment of the operator, the wheel is at such elevation as to reach the desired depth in the tooth space. Sighting by eye along the tooth space is generally sufficiently accurate for this setting. The table stopping and head starting device is then initially adjusted so as to be well inside the near edge of the broach, any arrangement of the supporting arms 141 and 147 found convenient being adopted. An arrangement substantially similar to that shown in Fig. 1 will be found suitable, care being taken to so adjust the device that the trigger member 175 is well within a tooth space and almost touching the tooth, sufficiently deep to insure positive contact yet not so deep as to make any sort of contact with the lowermost portion of the tooth space. The table is then moved to the right a sufficient distance to insure that the left end of the broach is on the right side of the table stopping switch device. During this movement of the table, it would be well to manually hold the trigger member out of the way so as to avoid breakage of the trigger.

The table hand control lever 96 is then placed in the broach grinding or central position. With the tool head throttle in the closed position, the table is started to the left by a momentary pressure of the manual starting switch 232, Fig. 40 only, this switch being employed only temporarily in view of the fact that the automatic table starting switch requires tool-head movement for actuation. When the first tooth in the path of the trigger mechanism reaches the trigger, it will close the switch 152 stopping the table. There is no creeping of the table because, first, all pressure to the table cylinder is cut off by the central positioning of the table control valve 79, and, second, at this central position each end of the table cylinder is then in communication with the other end because of the fact that the exhaust ports 84 and 85 in the table control valve body both connect with the common exhaust passage 86. By this means pressure on each side of the table cylinder piston is equalized.

By the use of the head throttle valve 74 the tool head may be caused to be moved out toward the broach, sufficiently near to be able to make a final adjustment of the grinding wheel. By use of the adjusting screw 8' the wheel may be adjusted to grind sufficient amount from the face of the tooth, this slide 8 being arranged to vary the position of the motor is a horizontal direction thereby obviating the necessity of attempting to adjust the table to the grinding wheel. After this adjustment has been made the machine may be allowed to continue the grinding, relying entirely on the automatic control.

It is preferable that the grinding wheel motor should be a reversing motor, that is, capable of running in either direction of rotation, as it is sometimes preferable to run in one direction when the gumming operation is being performed and in the opposite direction when the backing-off operation is being performed. The backing-off operation varies only slightly from the gumming operation, it being preferable that a cup wheel is employed in place of a disk type wheel. In using a cup wheel the grinding wheel motor is swivelled on the slide 8 to a nearly vertical position and the table stopping switch is rearranged so that the tooth that is to be ground is the one that is to be contacted by the blade of the table stopping switch.

While the apparatus described is particularly intended for the grinding and sharpening of the teeth of broaches, it is apparent that the apparatus may be capable of performing other grinding operations where the surfaces to be ground are arranged in spaced relation throughout the length of the work-piece and which act to control a step-by-step feed of a work-piece and to also control the operation of a reciprocatory grinding wheel.

Having thus described my invention, I claim:

1. In a machine for grinding a work-piece, means for imparting a step-by-step feeding movement to said work-piece, devices actuated by contact alternately with parts of said work-piece to control said means to stop the feed of said work-piece, a grinding wheel, and means to move said wheel in operative relation with said work-piece and withdraw the same at each stoppage of said work-piece.

2. In a machine for grinding a work-piece having a series of protuberances throughout the length thereof, of means for imparting a step-by-step feeding movement to said work-piece, a grinding wheel head, a grinding wheel carried by said head, means for reciprocating said head to bring said wheel in operative relation with said work-piece at each stoppage thereof, and devices actuated by the protuberances of said work-piece to control both of said means to stop the feed of said work-piece and start the reciprocation of said head.

3. In a machine for grinding a work-piece having a series of protuberances throughout the length thereof, of means for imparting a step-by-step feeding movement to said work-piece, a grinding wheel head, a grinding wheel carried by said head, means for reciprocating said head to bring said wheel in operative relation with said work-piece at each stoppage thereof, devices actuated by the protuberances of said work-piece to control both of said means to stop the feed of said work-piece and start the reciprocation of said head, and means on said head to stop the reciprocation of said head after it has been withdrawn from operative relation with said work-piece.

4. In a machine for grinding a work-piece, of means for imparting a step-by-step movement to said work-piece, means adaptable by contact with the moving work-piece to stop the movement of said work-piece, a grinding wheel, means associated with said stopping means to cause a reciprocation of the grinding wheel in operative relation with the work-piece, and means associated with said grinding wheel to stop said reciprocation of the grinding wheel and to start a succeeding movement of said work-piece.

5. In a machine for grinding a work-piece, of means for imparting a step-by-step feeding movement to said work-piece including a hydraulic cylinder and a control valve for same, devices actuated by contact alternately with succeeding parts of said work-piece to control said valve to stop the feed of said work-piece, a grinding wheel, and means to move said wheel in operative relation with said work-piece and withdraw and stop the same at each stoppage of said work-piece.

6. In a machine for grinding a work-piece having a series of protuberances throughout the length thereof, of means for imparting a step-by-step feeding movement to said work-piece including a hydraulic cylinder and a control valve for same, a grinding wheel head, a grinding wheel carried by said head, means for reciprocating said head including a hydraulic cylinder and control valve for same to bring said wheel in operative relation with said work-piece at each stoppage and devices actuated by the protuberances of said work-piece to control both of said valves to stop the feed of said work-piece and start the reciprocation of said head.

7. In a machine for grinding a work-piece having a series of protuberances throughout the length thereof, means for imparting a step-by-step feeding movement to said work-piece including a hydraulic cylinder and a control valve for same, a grinding wheel head, a grinding wheel carried by said head, means for reciprocating said head including a hydraulic cylinder and a control valve for same to bring said wheel in operative relation with said work-piece at each stoppage thereof, devices actuated by the protuberances of said work-piece to control both of said valves to stop the feed of said work-piece and start the reciprocation of said head and means on said head to control the valve of the cylinder which operates said head to stop the reciprocation of said head after it has been withdrawn from operative relation with said work-piece.

8. In a machine for grinding a work-piece, means for imparting a step-by-step movement to said work-piece including a hydraulic cylinder and a control valve for same, means adaptable by contact with the moving work piece to control said valve to stop the movement of said work-piece, a grinding wheel, means including a hydraulic cylinder and a control valve for same to reciprocate said wheel, means associated with said stopping means to control said last-mentioned valve to cause reciprocation of the grinding wheel in operative relation with the work-piece, and means associated with said grinding wheel to control said last-mentioned valve to stop said reciprocation of the grinding wheel and to control the first-mentioned valve to start a succeeding movement of said work-piece.

9. In a machine for grinding a work-piece, means for imparting a step-by-step feeding movement to said work-piece including a hydraulic cylinder, a control valve for same, and electrical devices for operating said control valve, devices actuated by contact alternately with succeeding parts of said work-piece to cause electrical devices to operate said valve to stop the feed of said work-piece, a grinding wheel, means to move said wheel in operative relation with said work-piece and withdraw and stop the same at each stoppage of said work-piece.

10. In a machine for grinding a work-piece having a series of protuberances throughout the length thereof, of means for imparting a step-by-step feeding movement to said work-piece including a hydraulic cylinder, a control valve for same, and electrical devices for operating said valve, a grinding wheel head, a grinding wheel carried by said head, means for reciprocating said head including a hydraulic cylinder, a control valve for same, and electrical devices for operating said valve to bring said wheel in operative relation with said work-piece at each stoppage thereof and devices actuated by the protuberances of said work-piece to control said electrical devices to stop the feed of said work-piece and start the reciprocation of said head.

11. In a machine for grinding a work-piece having a series of protuberances throughout the length thereof, means for imparting a step-by-step feeding movement to said work-piece including a hydraulic cylinder, a control valve for same and electrical devices for operating said valve, a grinding wheel head, a grinding wheel carried by said head, means for reciprocating said head including a hydraulic cylinder, a control valve for same and electrical devices for operating said valve to bring said wheel in operative relation with said work-piece at each stoppage thereof, devices actuated by the protuberances of said work-piece to control both of said electrical devices to stop the feed of said work-piece and start the reciprocation of said head, and means on said head to control the valve of the cylinder which operates said head to stop the reciprocation of said head after it has been withdrawn from operative relation with said work-piece.

12. In a machine for grinding, a work-piece, means for imparting a step-by-step feeding movement to said work-piece including a hydraulic cylinder, a control valve for same and electrical devices for operating said valve, means adaptable by contact with the moving work-piece to control the electrical devices to stop the movement of said work-piece, a grinding wheel, means including a hydraulic cylinder, a control valve for same, and electrical devices to operate said control valve to reciprocate said wheel, means associated with said stopping means to control said last-mentioned electrical devices to cause reciprocation of the grinding wheel in operative relation with the work-piece upon the stoppage thereof, and means associated with said grinding wheel to control the valve of the hydraulic cylinder which reciprocates the same to stop said reciprocation of the grinding wheel and to control the first-mentioned electrical device to start a succeeding movement of said work-piece.

13. In a machine for sharpening a toothed broach, means for imparting a step-by-step feeding movement to said broach, devices actuated by contact alternately with the teeth of said broach to control said means to stop the feed of said broach, a grinding wheel, and means to reciprocate said grinding wheel across the broach parallel with the teeth to be ground at each stoppage of said broach.

14. In a machine for sharpening a toothed broach, means for imparting a step-by-step feeding movement to said broach, a grinding wheel, means for imparting a reciprocatory movement to said grinding wheel parallel with the work faces of the teeth of said broach, and devices actuated by contact alternately with the working faces of the teeth of said broach to control the means to stop the feed of said work piece and control the means to reciprocate said grinding wheel.

15. In a machine for sharpening a broach having a series of spaced cutting teeth, of means for imparting a step-by-step feeding movement to said broach, a grinding wheel head, a grinding wheel carried by said head, means for reciprocating said head to bring said wheel in operative relation with a tooth of said broach at each stoppage thereof, devices actuated by the teeth of said broach to control both of said means to stop the feed of said broach and start the reciprocation of said head, means on said head to stop the reciprocation of said head after it has been withdrawn from operative relation with said broach.

16. In a machine for sharpening a toothed broach, means for imparting a step-by-step movement to said broach, means adaptable by contact with the moving broach to stop the movement thereof, a grinding wheel, means associated with said stopping means to cause a reciprocation of said grinding wheel in operative relation with a tooth of said broach, and means associated with said grinding wheel to stop said reciprocation thereof and start the succeeding movement of said broach.

17. In a machine for sharpening a toothed broach, means for imparting a step-by-step feeding movement to said broach including a hydraulic cylinder and a control valve for same, devices actuated by contact alternately with the teeth of said broach to control said valve to stop the feed of said broach, a grinding wheel, and means to move said wheel in operative relation with the teeth of said broach and withdraw and stop the same at each stoppage of said broach.

18. In a machine for sharpening a broach having a series of spaced teeth extending the length thereof, of means for imparting a step-by-step feeding movement to said broach including a hydraulic cylinder and a control valve for same, a grinding wheel head, a grinding wheel carried by said head, means for reciprocating said head including a hydraulic cylinder and control valve for same to bring said wheel in operative relation with a tooth of said broach at each stoppage thereof and devices actuated by the teeth of said broach to control both of said valves to stop the feed of said broach and start the reciprocation of said head.

19. In a machine for sharpening a broach having a series of teeth through the length thereof, means for imparting a step-by-step feeding movement to said broach including a hydraulic cylinder and a control valve for same, a grinding wheel head, a grinding wheel carried by said head, means for reciprocating said head including a hydraulic cylinder and a control valve for same to bring said wheel in operative relation with each tooth of said broach at each stoppage of said broach, devices actuated by the teeth of said broach to control both of said valves to stop the feed of said broach and start the reciprocation of said head, and means on said head to control the valve of the cylinder which operates said head to stop the reciprocation of said head after it has been withdrawn from operative relation with the teeth of said broach.

20. In a machine for sharpening a broach having a series of cutting teeth, means for imparting a step-by-step movement including a hydraulic cylinder and a control valve for same, means adaptable by contact with a tooth of said broach to control the said valve to stop the movement of said broach, a grinding wheel, means including a hydraulic cylinder and a control valve for same to reciprocate said wheel, means associated with said stopping means to control said last-mentioned valve to cause reciprocation of the grinding wheel in operative relation with the teeth of said broach upon the stopping of said broach, and means associated with said grinding wheel to control said last-mentioned valve to stop reciprocation of the grinding wheel and to control the first-mentioned valve to start a working movement of said broach.

21. In a machine for sharpening a broach provided with a series of cutting teeth, of means for imparting a step-by-step feeding movement to said broach including a hydraulic cylinder, a control valve for same, and electrical devices for operating said control valve, devices actuated by contact alternately with the teeth of said broach to cause electrical devices to operate said valve to stop the feed of said broach, a grinding wheel, and means to move said wheel in operative relation with a tooth of said broach and withdraw and stop the same at each stoppage of said broach.

22. In a machine for sharpening a broach having a series of cutting teeth throughout the length thereof, means for imparting a step-by-step feeding movement to said broach including a hydraulic cylinder, a control valve for same and electrical devices for operating said valve, a grinding wheel head, a grinding wheel carried by said head, means for reciprocating said head including a hydraulic cylinder, a control valve for same, and electrical devices for operating said valve to bring said wheel in operative relation with the teeth of said broach at each stoppage of said broach, and devices actuated by the teeth of said broach to control said electrical devices to stop the feed of said broach and start the reciprocation of said head.

23. In a machine for sharpening a broach having a series of teeth throughout the length thereof, means for imparting a step-by-step movement to said broach including a hydraulic cylinder, a control valve for same and electrical devices for operating said valve, a grinding wheel head, a grinding wheel carried by said head, means for reciprocating said head including a hydraulic cylinder, a control valve for same and electrical devices for operating said valve to bring said wheel in operative relation with a tooth of said broach at each stoppage of said broach, devices actuated by the teeth of said broach to control both of said electrical devices to stop the feed of said broach and start the reciprocation of said head, and means on said head to control the valve of the cylinder which operates said head to stop the reciprocation of said head after it has been withdrawn from operative relation with said broach.

24. In a machine for sharpening a toothed broach, means for imparting a step-by-step movement to said broach including a hydraulic cylinder, a control valve, and electrical devices for operating said valve, means adaptable by contact with a tooth of the moving broach to control the electrical devices to stop the movement of said broach, a grinding wheel, means including a hydraulic cylinder, a control valve for same, and electrical devices to operate said control valve to reciprocate said wheel, means associated with said stopping means to control said last-mentioned electrical devices to cause reciprocation of the grinding wheel in operative relation with the teeth of said broach upon the stoppage of said broach and means associated with said grinding wheel to control the valve of the hydraulic cylinder which reciprocates the same to stop said reciprocation of the grinding wheel and to control the first-mentioned electrical device to start a succeeding movement of said broach.

25. In a machine for sharpening a tapered toothed broach, a support for said broach, means for imparting a step-by-step feeding movement to said support, devices actuated by contact alternately with the teeth of said broach to control said means to stop the feed of said broach support, a grinding wheel, means to reciprocate said grinding wheel across the broach parallel with the tooth to be ground at each stoppage of said broach, and means to adjust said broach support to bring each of the teeth of said broach in the same relative position with relation to said grinding wheel.

WILLIAM G. BALDENHOFER.